United States Patent
Kim et al.

(10) Patent No.: US 6,845,185 B2
(45) Date of Patent: Jan. 18, 2005

(54) HIGH-SPEED WAVELENGTH CHANNEL SELECTOR AND HIGH-SPEED PHOTONIC INTEGRATED CIRCUIT-TYPE SPACE AND WAVELENGTH MULTIPLEXED CHANNEL SELECTOR EMPLOYING THE SAME

(75) Inventors: Kyong Hon Kim, Taejon (KR); Joon Tae Ahn, Taejon (KR); Yong Gyu Choi, Taejon (KR); Doo-Hee Cho, Taejon (KR)

(73) Assignee: Electronics and Telecommunications Research Institute (KR)

( * ) Notice: Subject to any disclaimer, the term of this patent is extended or adjusted under 35 U.S.C. 154(b) by 159 days.

(21) Appl. No.: 10/123,337

(22) Filed: Apr. 15, 2002

(65) Prior Publication Data

US 2002/0159688 A1 Oct. 31, 2002

(30) Foreign Application Priority Data

Apr. 16, 2001 (KR) ........................................ 2001-20281

(51) Int. Cl.[7] ................................................. G02B 6/12
(52) U.S. Cl. .............................. 385/14; 385/15; 385/16; 385/37
(58) Field of Search ............................... 385/14, 15, 16, 385/37

(56) References Cited

U.S. PATENT DOCUMENTS

| | | | | |
|---|---|---|---|---|
| 5,170,273 A | 12/1992 | Nishio | ......................... | 359/128 |
| 5,274,487 A | 12/1993 | Fujimoto et al. | ........... | 359/117 |
| 5,657,144 A | 8/1997 | Tanaka et al. | ............... | 359/128 |
| 5,838,848 A | 11/1998 | Laude | ......................... | 385/24 |
| 5,889,600 A | 3/1999 | McGuire | ..................... | 359/128 |
| 6,449,073 B1 * | 9/2002 | Huber | ......................... | 398/82 |
| 2003/0133641 A1 * | 7/2003 | Yoo | ............................. | 385/14 |
| 2003/0174926 A1 * | 9/2003 | Oikawa et al. | ............... | 385/14 |

FOREIGN PATENT DOCUMENTS

JP        2000-294809        10/2000

OTHER PUBLICATIONS

Bjorklund et al., "Prospects for Electro–optic Polymer Devides", Lasers and Electro–Optics Society Annual Meeting, 1993. LEOS '93 Conference Proceedings. IEEE, Nov. 15–18, 1993, pp. 466–477.*

(List continued on next page.)

*Primary Examiner*—Rodney Bovernick
*Assistant Examiner*—Sung Pak
(74) *Attorney, Agent, or Firm*—Blakely Sokoloff Taylor & Zafman

(57) ABSTRACT

A high-speed wavelength channel selector has properties of relatively easy manufacturing and easy extension to multi-channel integration, and a high-speed space and wavelength multiplexed channel selector uses the high-speed wavelength channel selector. The high-speed wavelength channel selector is integrated with electro-optic waveguide switches of non-crystalline materials, such as electro-optic polymers or glasses, in the middle of a pair of wavelength multiplexer and demultiplexer and the high-speed space and wavelength multiplexed channel selector has the photonic integrated circuit-type composition of a space multiplexed channel selector containing M electro-optic waveguide switches and an M×1 channel combiner, the high-speed wavelength channel selector, optical amplifier and a high-speed wavelength converter.

22 Claims, 18 Drawing Sheets

OTHER PUBLICATIONS

Kaczmarski et al., "Design of an Integrated Electro–optic Switch in Organic Polymers", Optoelectronics, IEE Proceedings J, vol. 136, Issue 3, Jun. 1989, pp. 152–158.*

Lee et al., "Polymeric Digital Optical Switch Incorporating Linear Branch with Modified Coupling Region", Electronics Letters, vol. 35, No. 15, Jul. 1999, pp. 1245–1246.*

IEEE Communications Magazine, Multifrequency Lasers and Applications in WDM Networks, Dec. 1998, pp. 39–41.

ECOC'98, A 2.56 Tb/s Throughput Packet/Cell–Based Optical Switch–Fabric Demonstrator, Sep. 20–24, 1998, Madrid, Spain, pp. 127–129.

NTT Review, Evolution of Optical Devices for WDM Networks, vol. 10, No. Jan. 1, 1998, pp. 14–20.

Loss–Less Four–Channel Wavelength Selector Monolithically Integrated on InP, pp. 21–23.

IEEE Photonics Technology Letters, vol. 6, No. 4, Apr. 1994, pp. 513–515.

Journal of Lightwave Technology, vol. 12, No. 9, Sep. 1994, pp. 1631–1639.

Journal of Lightwave Technology, vol. 17, No. 10, Oct. 1999, pp. 1732–1741.

22nd European Conference of Optical Communication—ECOC'96, Oslo, pp. 33–40.

Journal of Lightwave Technology, vol. 16, No. 12, Dec. 1998, pp. 2212–2219.

Journal of Lightwave Technology, vol. 12, No. 6, Jun. 1994, pp. 957–962.

IEEE Photonics Technology Letters, vol. 8, No. 7, Jul. 1996, pp. 870–872.

IEEE Photonics Technology Letters, vol. 6, No. 4, Apr. 1994, pp. 513–515.

IEEE Photonics Technology Letters, vol. 6, No. 4, Apr. 1994, p. 516–518.

IEEE Photonics Technology Letters, vol. 11, No. 2, Feb. 1999, pp. 242–244.

IEEE Photonics Technology Letters, vol. 12, No. 1, Jan. 2000, pp. 34–36.

IEEE Photonics Technology Letters, vol. 5, No. 12, Dec. 1993, pp. 1448–1451.

Journal of Lightwave Technology, vol. 14, No. 6, Jun. 1996, pp. 977–984.

Electronics Letters, Apr. 28, 1994, vol. 30, No. 9, 6 pages.

Electronics Letters, Sep. 17, 1998, vol. 34, No. 19, pp. 1841–1843.

Electronics Letters, Sep. 28, 1995, vol. 31, No. 20, pp. 1762–1764.

Electronics Letters, Sep. 10, 1992, vol. 28, No. 19, pp. 1805–1807.

Notice of Preliminary Rejection; JP Laid Open No. 12–294809; Feb. 28, 2003; "High–Speed WAvelength Channel Selector and High–Speed . . . ".

* cited by examiner

HIGH-SPEED WAVELENGTH CHANNEL SELECTOR AND HIGH-SPEED PHOTONIC INTEGRATED CIRCUIT-TYPE SPACE AND WAVELENGTH MULTIPLEXED CHANNEL SELECTOR EMPLOYING THE SAME

FIELD OF THE INVENTION

The present invention relates to a high-speed planar waveguide-type optical wavelength channel selector based on electro-optic switches using electro-optic non-crystalline materials such as electro-optic polymer and glass materials, and further to its applications for high-speed photonic integrated space- and wavelength-division channel selecting switch fabrics intended for optical communication network node systems.

BACKGROUND OF THE INVENTION

High-speed wavelength channel selectors have been demonstrated in various schemes by positioning optical switches, such as semiconductor optical amplifier gates, optical amplifiers, electro-optic single crystal switches, or tunable optical filters, between a pair of arrayed waveguide gratings for optical packet signal processing systems.

The conventional schemes use combinations of the optical switches of semiconductor optical amplifier gates or electro-optic single crystal switches with silica or semiconductor wavelength multiplexer(s) and demultiplexer(s). However, there has been no report on hybrid or monolithic integrated high-speed wavelength channel selectors using electro-optic switches made of non-crystalline materials, such as electro-optic polymer or glass materials, with the wavelength multiplexer(s) and demultiplexer(s).

The conventional high-speed wavelength channel selectors will be described in detail hereinafter.

Referring to FIG. 1, there is shown a previous known conceptual scheme of a general high-speed wavelength channel selector.

This scheme is based on a combination of a 1×N wavelength demultiplexer (DEMUX) 2, optical switches 7, and an N×1 wavelength multiplexer (MUX) 3, which are connected with internal optical waveguides 1b and located between input and output optical waveguides 1a and 1c. For a detailed description, there is provided a reference directed to Y. Yoshikuni et al., NTT Review, Vol. 10, No. 1, pp. 14–20 (1998).

FIG. 2A represents a conventional high-speed wavelength channel selector including semiconductor optical amplifiers (SOAs) and planar arrayed waveguide gratings.

In this scheme, semiconductor optical amplifier gates (SOAGS) 7a are used as optical switches, and silica arrayed waveguide grating type 1×N demultiplexer 2a and N×1 multiplexer 3a are used as a wavelength demultiplexer and a wavelength multiplexer, respectively. The SOAGs 7a have advantages of small volume and optical gain, but have technical limitations on achieving a high yield on device fabrication due to complicate and high cost device fabrication processes. Furthermore, current technologies use either hybrid integration of the SOAGs with the silica arrayed waveguide gratings, which require cost and time consuming device integration processes, or monolithic integration of the SOAGs with semiconductor arrayed waveguide gratings, which have poor waveguide characteristics and difficulties in device fabrication yet.

This conventional scheme has been introduced by H. Ishii et al., IEEE Photonics Technol. Lett., Vol. 11, No. 2, pp. 242–244 (1999), and by R. Kasahara et al., IEEE Photonics Technol. Lett., Vol. 12, No. 1, pp. 34–36 (2000).

Referring to FIG. 2B, there is illustrated a conventional high-speed wavelength channel selector including optical amplifiers and planar arrayed waveguide gratings.

In this scheme, optical amplifiers 7b are used as optical switches, and silica arrayed waveguide grating type 1×N demultiplexer 2a and N×1 multiplexer 3a are used as a wavelength demultiplexer and a wavelength multiplexer, respectively.

The optical amplifiers 7b can be one of semiconductor optical amplifiers, fiber amplifiers, or planar waveguide-type optical amplifiers. The semiconductor optical amplifiers are most commonly investigated to realize the high-speed wavelength channel selector schemes. This composition of the optical amplifiers and the planar arrayed waveguide gratings has been developed not only for high-speed wavelength channel selectors but also for optical power equalizers between channels. In order to provide a further detailed description for this scheme, there are provided references directed to M. Zirngibl et al., IEEE Photonics Technol. Lett., Vol. 6, No. 4, pp. 513–515 (1994), and M. Zirngibl and C. H. Joyner, Electronics Lett., Vol. 30, No. 9, pp. 700–701 (1994).

Referring to FIG. 2C, there is provided a conventional high-speed wavelength channel selector employing electro-optic switches 7c based on single-crystal materials instead of the semiconductor optical amplifier gates shown in FIG. 2A.

When using electro-optic switches such as $LiNbO_3$ switches in this scheme, monolithic integration with a wavelength multiplexer and a wavelength demultiplexer is not easily realizable, but only hybrid integration is required. The hybrid integration has a disadvantage of difficult device fabrication. This scheme has been introduced by Y. Yoshikuni et al., NTT Review, Vol. 10, No. 1, pp. 14–20 (1998).

FIG. 2D shows a conventional high-speed wavelength channel selector including tunable filters (T.F.) 7d, wavelength (λ) converters 5, and planer arrayed waveguide gratings 2a and 3a.

In this scheme, sets of the wavelength tunable filters 7d and the wavelength converters 5 are used as optical switches, and the planar arrayed waveguide grating type 1×N demultiplexer 2a and N×1 multiplexer 3a as those in FIG. 2A are used as a wavelength demultiplexer and a wavelength multiplexer, respectively.

This scheme is depicted in U.S. Pat. Nos. 5,170,273, 5,194,977, 5,694,499, and 5,889,600. This scheme employing the wavelength tunable filters 7d and the wavelength converters 5 has difficulties on high-speed channel selection and channel locking of the tunable filters, and has a problem in practical system applications due to a complicate geometry caused by using many wavelength converters.

In FIG. 3, there is illustrated a conventional high-speed wavelength channel selector using Mach-Zehnder type optical switches 4.

As shown in FIG. 3, the high-speed wavelength channel selector is based on matrix-type composition of Mach-Zehnder type optical switches 4. The detailed description for this scheme is provided by A. El Fatatry et al., Electronics Lett., Vol. 24, No. 6, pp. 339–340 (1988) and R. Nagase et al., Journal of Lightwave Technology, Vol. 12, No. 9, pp. 1631–1639 (1994).

This wavelength channel selector has a switching scheme to connect a desired channel selected from input optical channels to a desired output path rather than to select a specific wavelength channel from many input wavelength channels. This scheme is not good for high-speed switching because it requires many cascaded switch operations between input and output paths and a complicate control process to operate the switches.

Referring to FIG. 4, there is shown a conventional scheme of a light source integrated wavelength converter 5.

This light source integrated wavelength converter 5 performs wavelength conversion for output signals of a high-speed wavelength channel selector when it is located at an output port of the wavelength channel selector, and has a scheme of converting a wavelength $\lambda_{in}$ of an inputted optical signal into a wavelength $\lambda_{out}$ by combining the input optical signal with an optical beam outputted from an optical pump beam source 20 at a nonlinear optical medium 19. In order to convert the wavelength of the optical signal into a desired channel wavelength by using this wavelength converter, the optical pump beam source 20 should be constituted by an N channel wavelength selectable laser, which is explained herein below in detail with reference to conventional schemes illustrated in FIGS. 5 to 9.

The wavelength converter shown in FIG. 4 provides an optical signal having the wavelength $\lambda_{out}$ varying depending on change of a wavelength of the optical pump beam coming out of the optical pump beam source 20, and illustrates merely a very elementary wavelength converter scheme which does not guarantee wavelength conversion of the optical signal into the ITU specified grid channel.

Referring to FIG. 5, there is provided a first exemplary scheme of a conventional N channel wavelength selectable laser which can be used as an optical pump beam source for the wavelength conversion scheme shown in FIG. 4.

The N channel wavelength selectable laser includes two N×N wavelength multiplexers 10a and 10b, N laser gain media 11 located on optical waveguides 1 connecting the two N×N wavelength multiplexers 10a and 10b, N pairs of optical switches 4a and 4b placed on outer waveguides of the two N×N wavelength multiplexers 10a and 10b, respectively, a highly reflective mirror 13 coated on one side end of the N channel wavelength selectable laser, and a partially reflective mirror 12 coated on the other side end of the N channel wavelength selectable laser.

This laser scheme was proposed by B. Glance et al., Journal of Lightwave Technology, Vol. 12, No. 6, pp. 957–961 (1994). This scheme has a disadvantage of requiring many waveguides containing optical gain media and many optical switches, and is realizable only with electro-luminescent materials like semiconductor compound materials as the optical gain media. Therefore, this scheme is not suitable for a laser with optical gain media requiring external optical pumping.

Referring to FIG. 6, there is illustrated a second exemplary scheme of a conventional N channel wavelength selectable laser which can be used as an optical pump beam source for the wavelength conversion scheme shown in FIG. 4.

This channel wavelength selectable laser scheme is composed of a 1×N wavelength demultiplexer 2, N laser gain media 14 located on N optical waveguides 1b of the 1×N wavelength demultiplexer 2, a highly reflective mirror 13 coated on one side containing an opposite end of the N laser gain media 14 with respect to the 1×N wavelength demultiplexer 2, and a partially reflective mirror 12 coated on a cross section of an output terminal of a single waveguide 1a of the 1×N wavelength demultiplexer 2. This scheme is reported by M. Zirngibl, IEEE Communications Magazine, pp. 39–41 (December 1998).

In FIG. 7, there is shown a third exemplary scheme of a conventional N channel wavelength selectable laser, which can be used as an optical pump beam source for the wavelength conversion scheme illustrated in FIG. 4.

The N channel wavelength selectable laser includes an N×N wavelength multiplexer 10, a highly reflective mirror 13 coated on a cross section of one side of N optical waveguides 1a of the N×N wavelength multiplexer 10, N laser gain media 14 located on N optical waveguides 1b of the other side of the 1×N wavelength multiplexer 10, and a partially reflective mirror 12 coated on output ends of the laser gain media 14.

This scheme is reported by M. Zirngibl et al., IEEE Photonics Technology Lett., Vol. 6, No. 4, pp. 516–51B (1994), and provides N separate channel laser outputs with selectable laser oscillation on each wavelength channel of N channels unlike one combined channel output of the scheme shown in FIG. 6.

Referring to FIG. 8, there is presented a fourth exemplary scheme of a conventional N channel wavelength selectable laser, which can be used as an optical pump beam source for the wavelength conversion scheme shown in FIG. 4.

This N channel wavelength selectable laser includes an N×N wavelength multiplexer 10, one set of N laser gain media 14a placed at one side of the N×N wavelength multiplexer 10 and connected with the N×N wavelength multiplexer 10 through N numbers of optical waveguides 1a, a highly reflective mirror 13 coated on the opposite ends of the N laser gain media 14a with respect to the waveguide connected ends, another set of N laser gain media 14b placed at the other side of the N×N wavelength multiplexer 10 and connected with the N×N wavelength multiplexer 10 through N numbers of optical waveguides 1b, and a partially reflective mirror 12 coated on the opposite ends of the N laser gain media 14b with respect to the waveguide connected ends.

This scheme is proposed by M. Zirngibl and C. H. Joyner, Electronics Lett., Vol. 30, No. 9, pp. 701–702 (1994).

In FIG. 9, there is provided an exemplary scheme of a conventional electro-luminescent multi-channel selectable laser which can be used as an optical pump beam source for the wavelength conversion scheme shown in FIG. 4.

This electro-luminescent multi-channel laser includes a series of semiconductor gain waveguides 16 having different lengths with a partially reflective mirror 12 coated on one ends of the waveguides, and a diffraction grating 15 of Rowland circle type, both of which are formed on a semiconductor wafer 17.

This scheme is reported by J. B. D. Soole et al., Electronics Lett., Vol. 28, No. 19, pp. 1805–1807 (19924).

As shown in FIGS. 5 to 9, the schemes of the conventional N channel wavelength selectable laser, each of which can be used as an optical pump beam source for the wavelength conversion scheme illustrated in FIG. 4, are not suitable for practical realization because the schemes require many optical waveguides composed of an optical gain medium especially when the optical gain medium only employs electro-luminescent materials such as compound semiconductors or photo-luminescent materials requiring optical pumping.

Moreover, the conventional schemes of the wavelength selectable laser using semiconductor optical amplifier switches for the optical pump beam source of the wavelength converter, which is then be used as one component in a high-speed wavelength selector for high-speed optical packet signal processing, have technical drawbacks such as complicate fabrication processing, high manufacturing cost and low product yield. Furthermore, the conventional schemes of the wavelength selectable laser are not easily realizable because of practically difficult integration properties when the schemes use single crystal electro-optic devices and problems for wavelength selection and locking to a specified wavelength when the schemes use wavelength tunable filters.

SUMMARY OF THE INVENTION

It is, therefore, a primary object of the present invention to provide a wavelength channel selector having properties of relatively easy manufacturing and easy extension to multi-channel integration by solving the problems related to the conventional schemes. The present invention reduces shortcomings of the conventional schemes, such as complicate fabrication processing, high manufacturing cost and low product yield, and avoids using either single crystal electro-optic devices or wavelength tunable filters, each of which causes problems of practically difficult integration and of difficult wavelength selection and locking, respectively.

Another object of the present invention is to provide a high-speed wavelength channel selector integrated with electro-optic waveguide switches of non-crystalline materials such as electro-optic polymers or glasses, in the middle of a pair of wavelength multiplexer and demultiplexer, and to provide a high-speed space and wavelength multiplexed channel selector having the photonic integrated circuit-type composition of a space multiplexed channel selector containing M electro-optic waveguide switches and an M×1 channel combiner, the inventive high-speed wavelength channel selector, optical amplifier and a high-speed wavelength converter.

In accordance with one aspect of the present invention, there is provided a high-speed wavelength channel selector comprising: a pair of wavelength multiplexer and demultiplexer formed on an optical waveguide; and a multi-channel optical waveguide switch array of electro-optic non-crystalline materials placed between the multiplexer and the demultiplexer, wherein the multiplexer, the demultiplexer and the optical waveguide switch array are constructed in the form of a single integrated device.

In accordance with another aspect of the present invention, there is provided a high-speed photonic integrated circuit-type wavelength channel selector comprising: a wavelength channel selector for selecting a wavelength channel of an inputted optical signal, which includes a pair of wavelength demultiplexer and multiplexer formed on an optical waveguide and a multi-channel optical waveguide switch array of electro-optic non-crystalline materials placed on a waveguide array connecting the wavelength demultiplexer and the wavelength multiplexer; and a wavelength converter, located on an output end of the wavelength channel selector, for converting a wavelength of a wavelength channel selected optical signal and outputting a wavelength converted optical signal by passing the wavelength channel selected optical signal through a nonlinear optic medium together with a pump laser beam.

In accordance with still another aspect of the present invention, there is provided a high-speed photonic integrated circuit-type space and wavelength multiplexed channel selector comprising: a space multiplexed channel selector for outputting a space channel selected wavelength-division multiplexed (WDM) optical signal based on an inputted space and wavelength-division multiplexed optical signal, which includes M numbers of optical waveguide switches and an M×1 optical channel combiner, M being an integer equal to or greater than 2; a wavelength channel selector for selecting a wavelength channel of the space channel selected WDM optical signal, which is connected to an output end of the space multiplexed channel selector and includes a pair of 1×N wavelength demultiplexer and N×1 wavelength multiplexer, N being an integer equal to or greater than 2, and a multi-channel optical waveguide switch array of electro-optic non-crystalline materials placed on a waveguide array connecting the demultiplexer and the multiplexer; and a wavelength converter, located on an output end of the wavelength channel selector, for converting a wavelength of a wavelength channel selected optical signal and outputting a wavelength converted optical signal by passing the wavelength channel selected optical signal through a nonlinear optic medium together with a pump laser beam.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
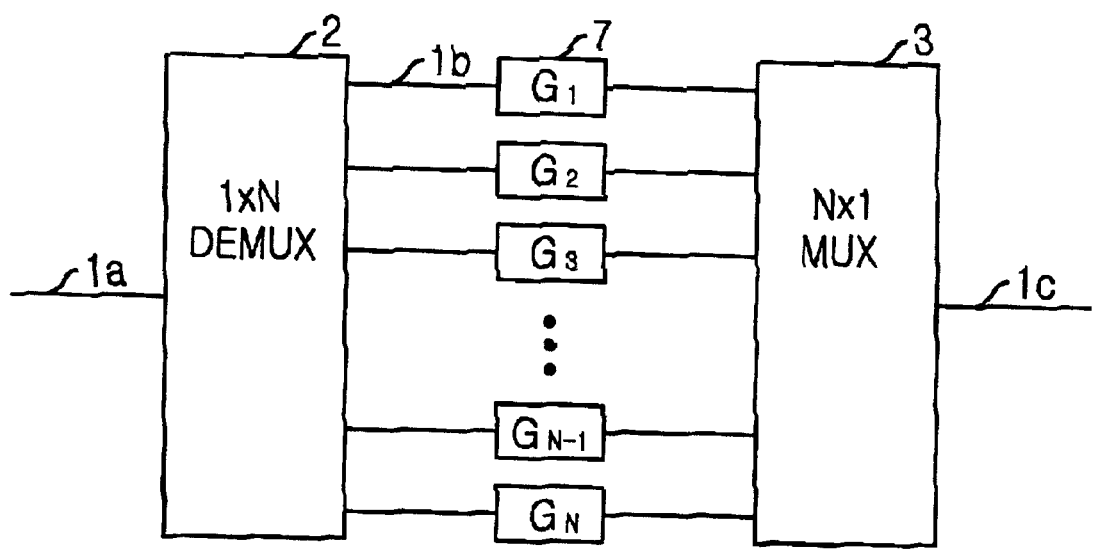
FIG. 1 is a block diagram showing a general scheme of a high-speed wavelength channel selector.
Figure 2A:
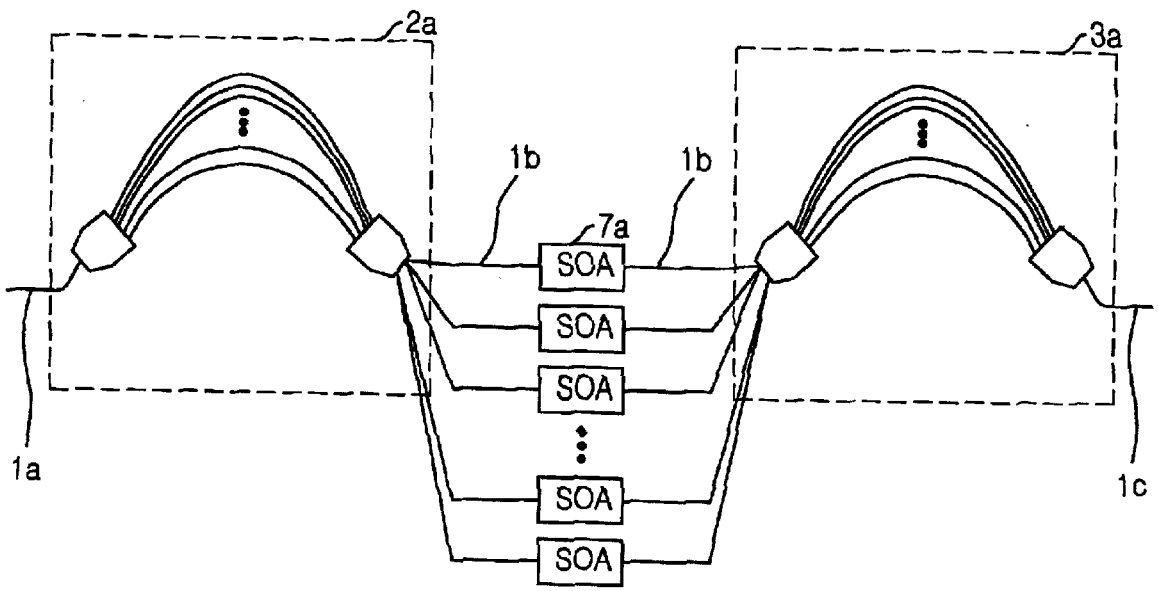
FIG. 2A is a block diagram of a conventional high-speed wavelength channel selector including semiconductor optical amplifiers and planar arrayed waveguide gratings.
Figure 2B:
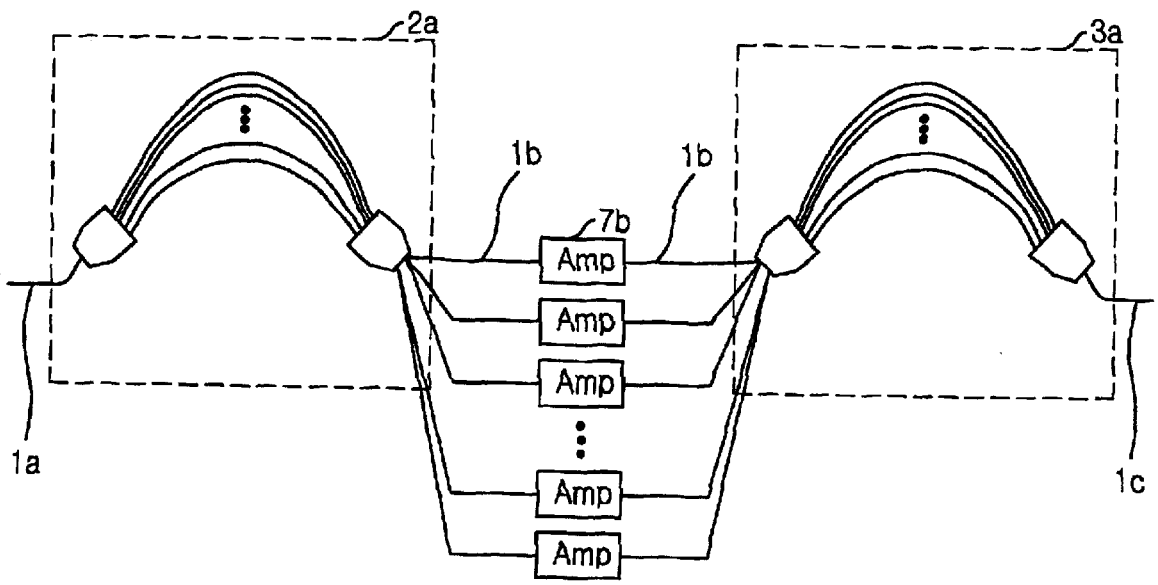
FIG. 2B is a block diagram of a conventional high-speed wavelength channel selector including optical amplifiers and planar arrayed waveguide gratings.
Figure 2C:
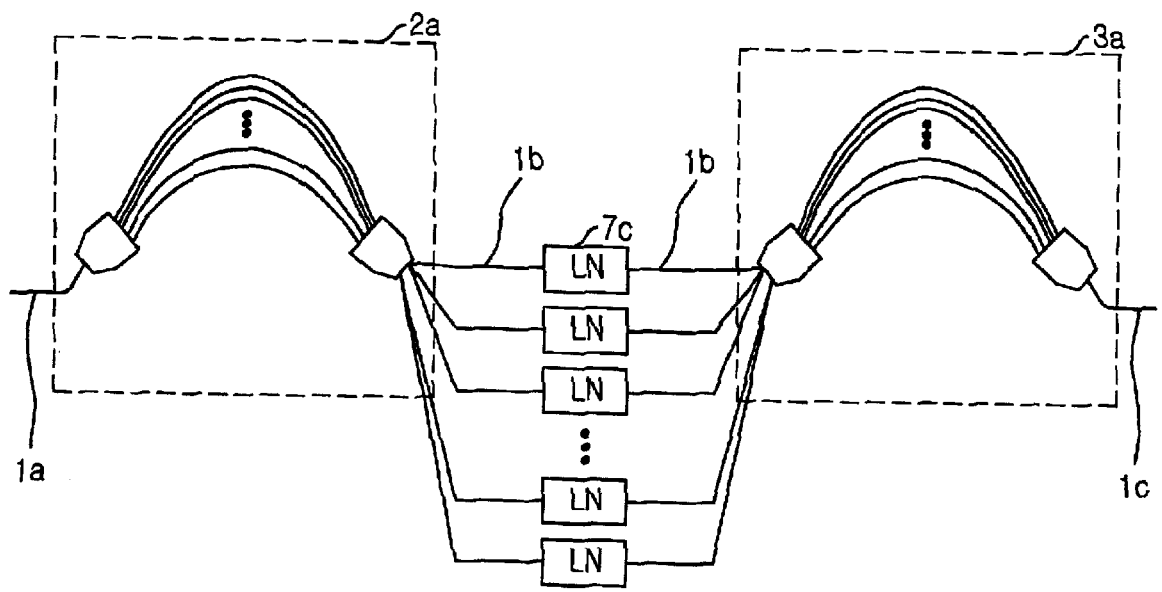
FIG. 2C is a block diagram of a conventional high-speed wavelength channel selector with electro-optic switches based on single-crystal materials.
Figure 2D:
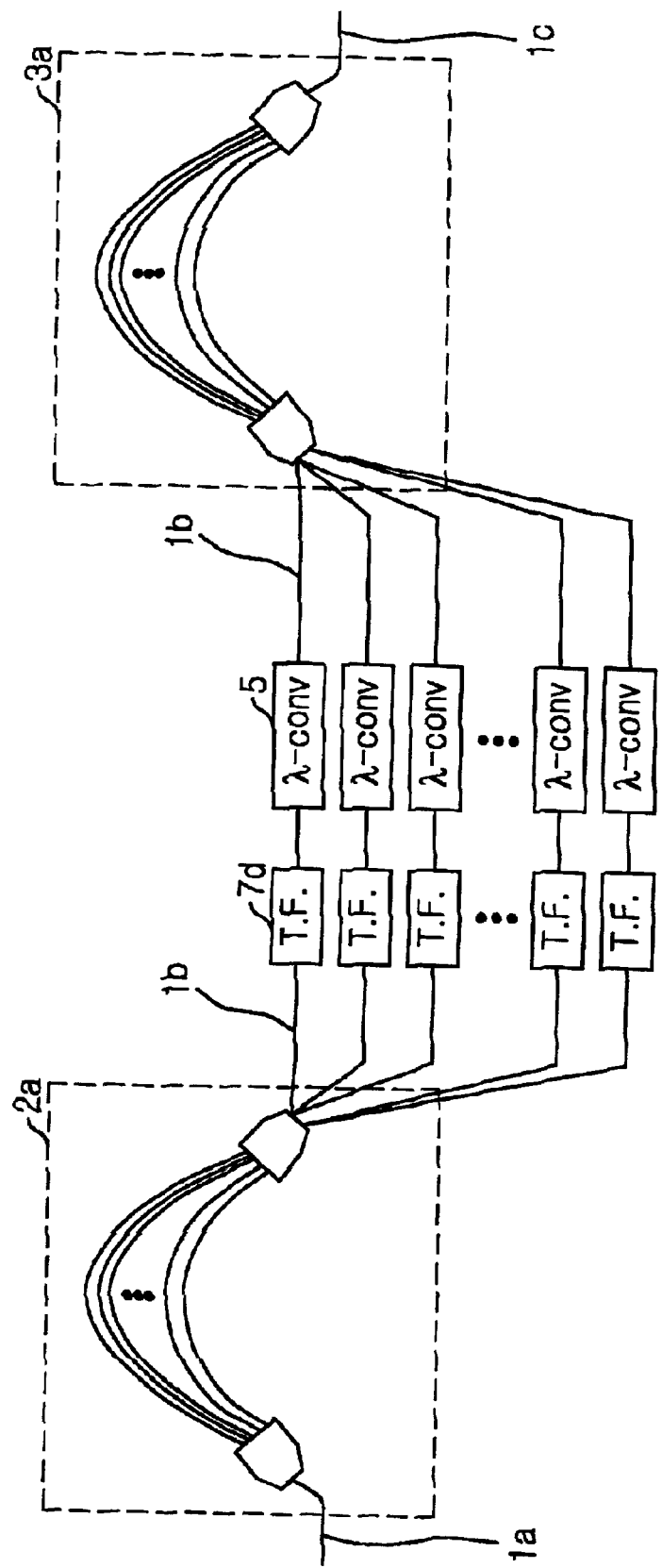
FIG. 2D is a block diagram of a conventional high-speed wavelength channel selector including tunable filters, wavelength converters and planar arrayed waveguide gratings.
Figure 3:
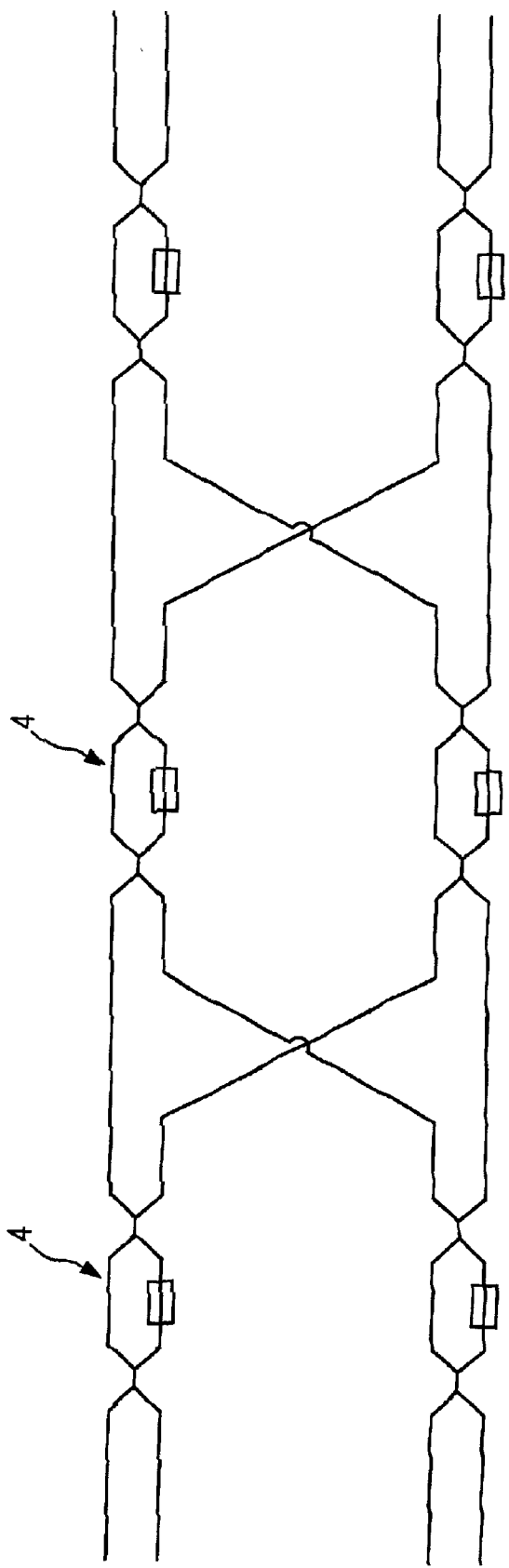
FIG. 3 is a block diagram of a conventional high-speed wavelength channel selector using Mach-zehnder type optical switches.
Figure 4:
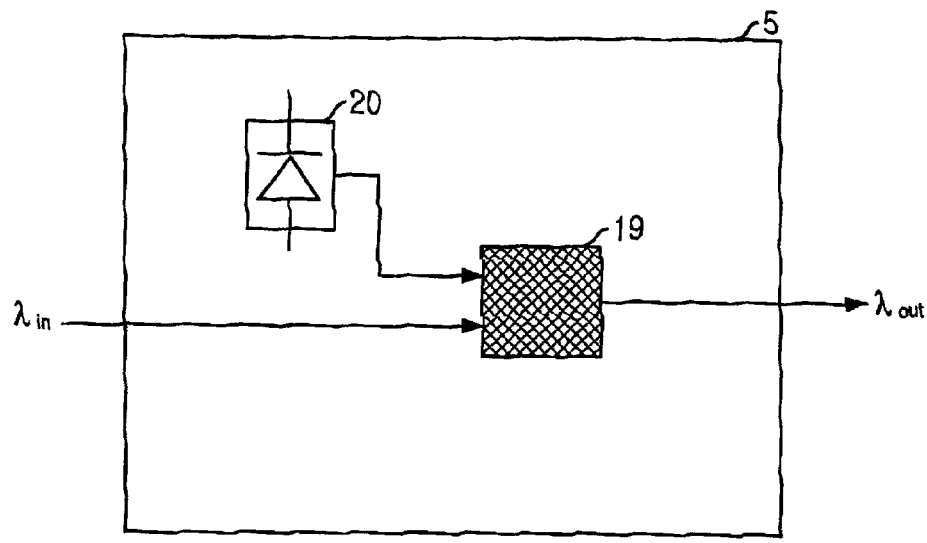
FIG. 4 is a block diagram of a conventional light source integrated wavelength converter.
Figure 5:
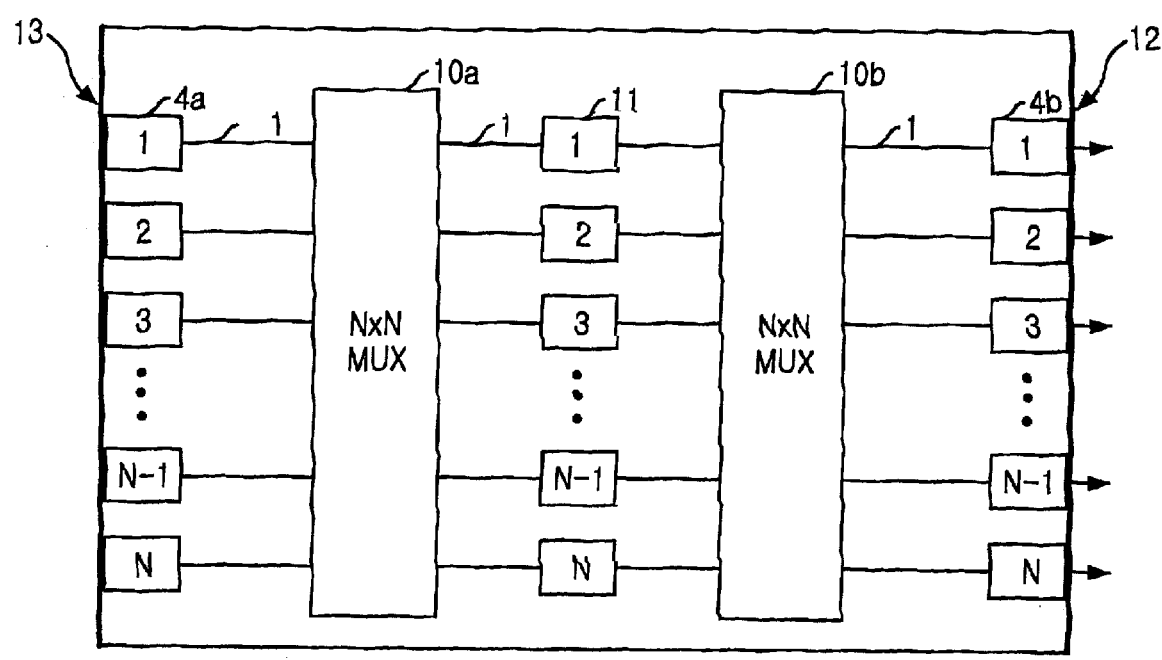
FIG. 5 is a block diagram showing a first exemplary scheme of a conventional N channel wavelength selectable laser, which includes two N×N wavelength multiplexers.
Figure 6:
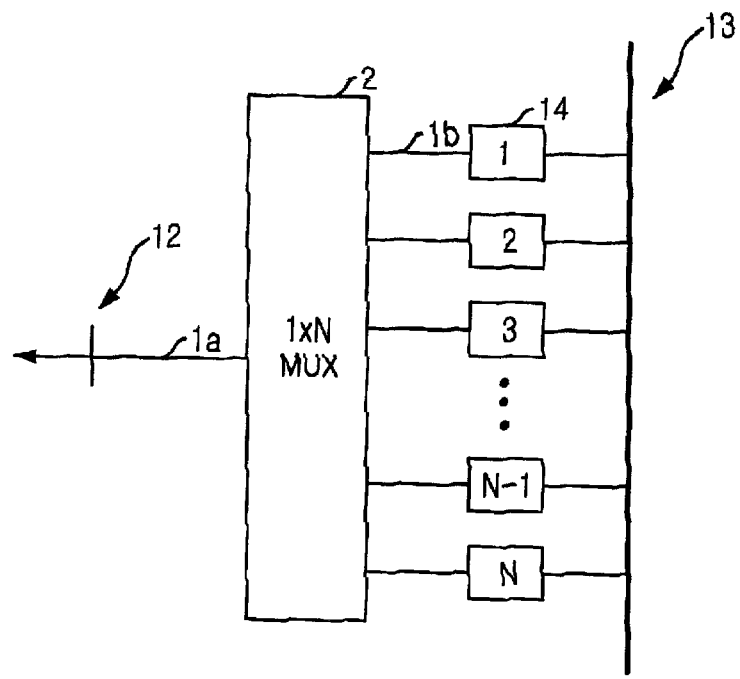
FIG. 6 is a block diagram showing a second exemplary scheme of the conventional N channel wavelength selectable laser, which includes a single output port.
Figure 7:
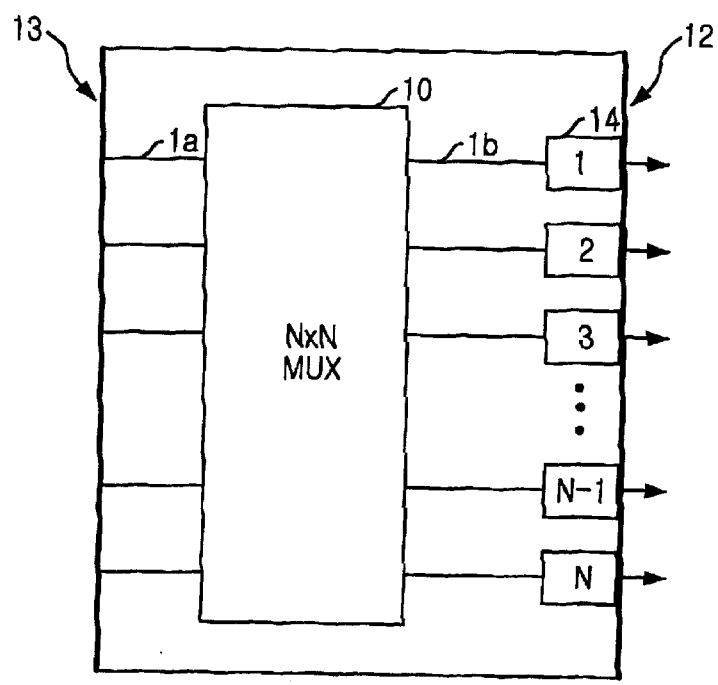
FIG. 7 is a block diagram showing a third exemplary scheme of the conventional N channel wavelength selectable laser, which includes one N×N wavelength multiplexer and one set of N array of gain media.
Figure 8:
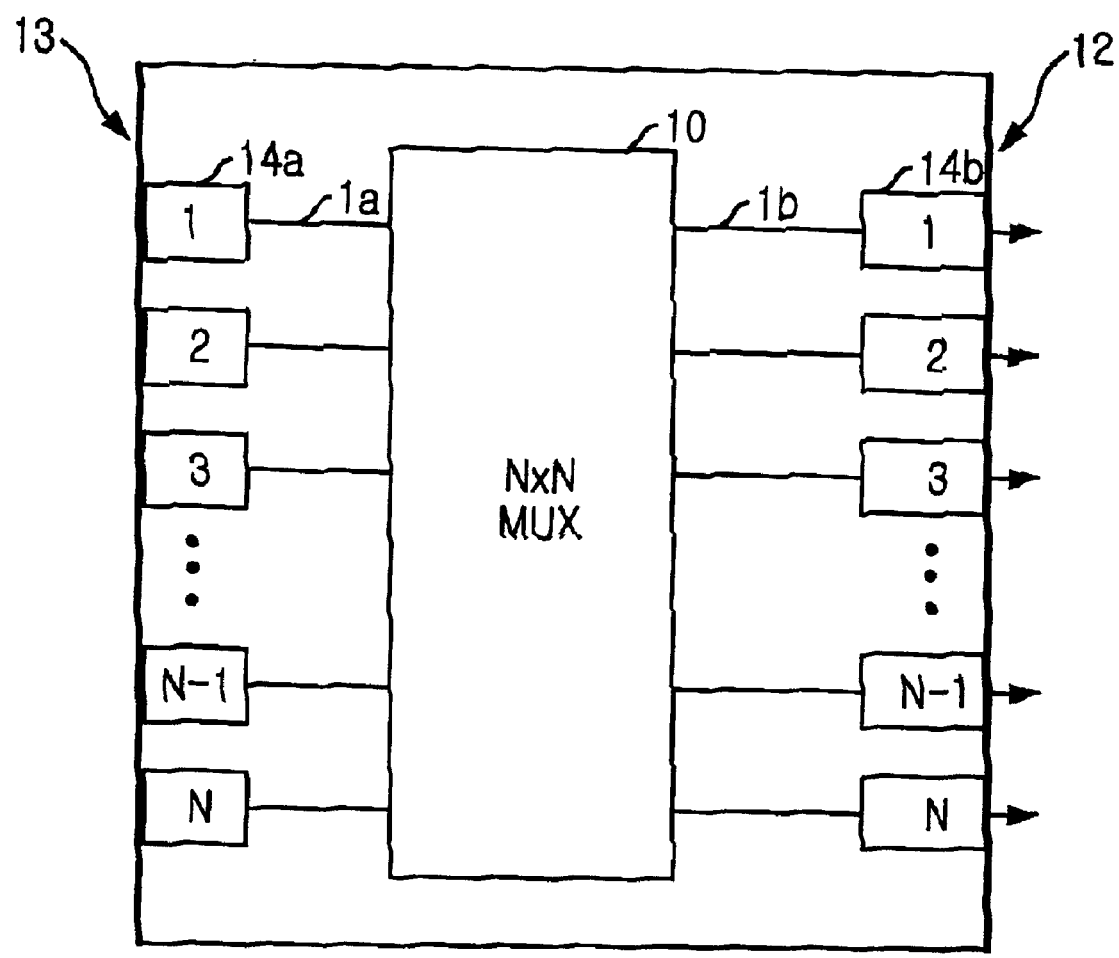
FIG. 8 is a block diagram showing a fourth exemplary scheme of the conventional N channel wavelength selectable laser, which includes one N×N wavelength multiplexer and two sets of N array of gain media.
Figure 9:
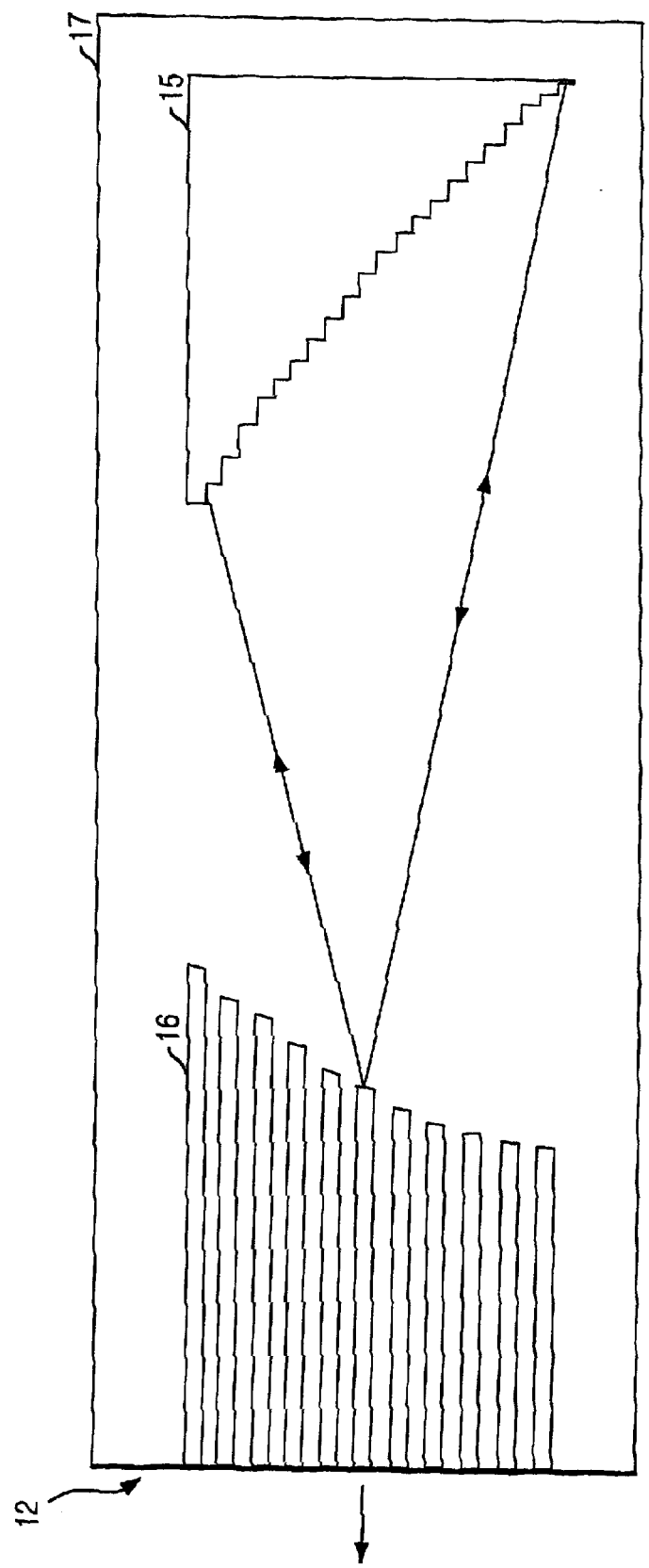
FIG. 9 is a block diagram showing a conventional electro-luminescent multi-channel laser, which uses a diffraction grating and a series of semiconductor gain waveguides of different lengths.

Hereinafter, with reference to the accompanying drawings, some preferred embodiments of the present invention will be explained in detail. It should be noticed that, when assigning reference numerals to components illustrated in each drawing, components performing a same or similar function are represented by same or similar reference numerals although they are shown in different drawings.

Figure 10:
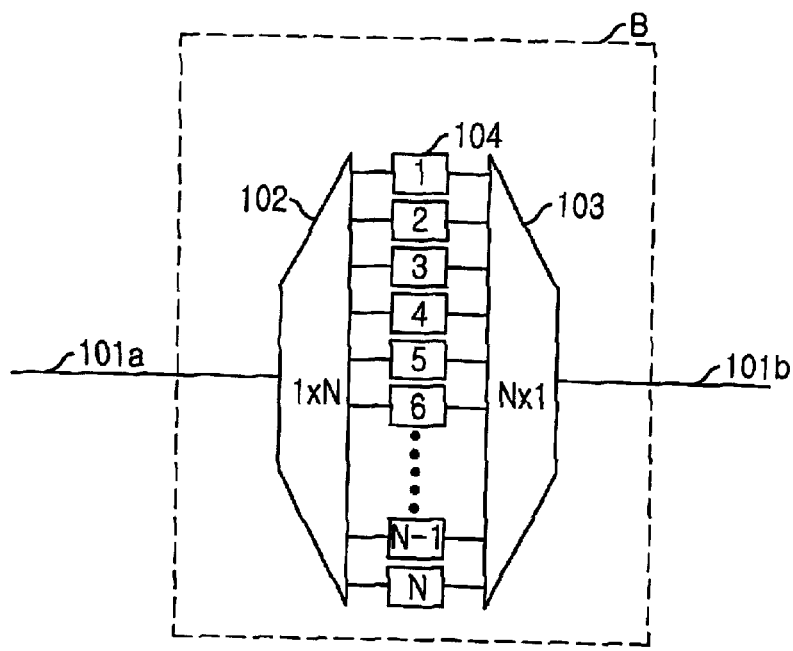
FIG. 10 is a block diagram of a high-speed wavelength channel selector in accordance with the present invention.

Referring to FIG. 10, there is shown a block diagram of a high-speed wavelength channel selector B in accordance with the present invention, which is based on a singly integrated scheme of a pair of wavelength demultiplexer 102 and multiplexer 103, a planar waveguide-type electro-optic switch array 104 of electro-optic non-crystalline materials, such as electro-optic polymers or glasses, placed between the demultiplexer 102 and the multiplexer 103, and input and output optical waveguides 101a and 10b located at signal input and output ports, respectively.

The high-speed wavelength channel selector B can be formed with a planar Mach-Zehnder type electro-optic waveguide switch instead of the planar waveguide-type electro-optic switch 104, and the pair of wavelength demultiplexer 102 and multiplexer 103 and the Mach-Zehnder type electro-optic waveguide switch can be integrated in a single planar waveguide of the same non-crystalline materials such as polymer or glass materials.

Another way of integrating the high-speed wavelength channel selector is to use hybrid integration of the pair of wavelength demultiplexer 102 and multiplexer 103 of glass materials and the planar Mach-Zehnder type electro-optic waveguide switch or the planar waveguide-type electro-optic switch of electro-optic polymer materials.

Figure 11:
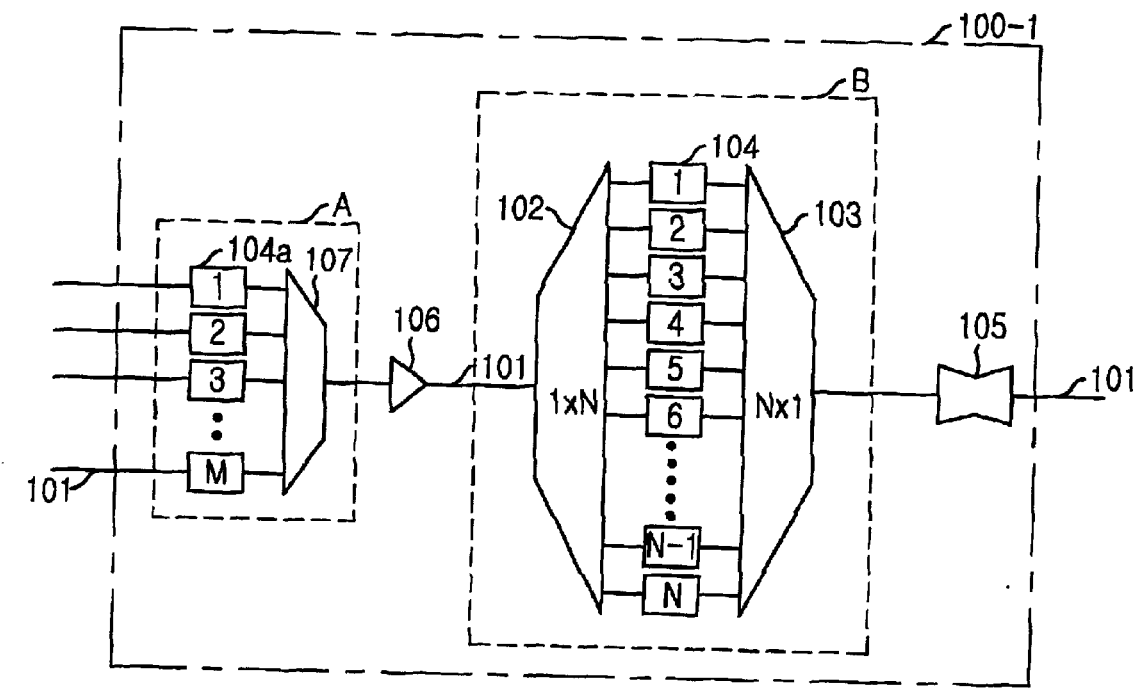
FIG. 11 is a block diagram of a high-speed photonic integrated circuit-type space and wavelength multiplexed channel selector in accordance with one embodiment of the present invention, which uses the high-speed wavelength channel selector illustrated in FIG. 10, an M×1 space channel selector, an optical amplifier and a wavelength converter.

Referring to FIG. 11, there is illustrated a block diagram of a high-speed photonic integrated circuit-type space and wavelength multiplexed channel selector 100-1 in accordance with one embodiment of the present invention, which employs the high-speed wavelength channel selector B illustrated in FIG. 10.

The space and wavelength multiplexed channel selector 100-1 includes an M channel space multiplexed channel selector A, an optical amplifier 106, the N channel high-speed wavelength channel selector B and a wavelength converter 105, all integrated on optical waveguides 101.

The M channel space multiplexed channel selector A has an M array of planar waveguide-type electro-optic switches 104a and an M×1 channel combiner 107, both of which are placed on an input signal waveguide section of the space and wavelength multiplexed channel selector 100-1, and performs space channel selection for inputted space- and wavelength-division multiplexed multi-channel optical signals to thereby output a space channel selected wavelength-division multiplexed (WDM) optical signal.

The optical amplifier 106 is formed into a planar waveguide optical amplifier which can be integrated with the M channel space multiplexed channel selector A and the N channel high-speed wavelength channel selector B in the same plane but in the middle of them so as to amplify the space channel selected WDM optical signal outputted from the M channel space multiplexed channel selector A and transmit an amplified optical signal to the N channel high-speed wavelength selector B.

As shown in FIG. 10, the N channel high-speed wavelength channel selector B is composed of a pair of wavelength demultiplexer 102 and multiplexer 103 and an N array of planar waveguide-type electro-optic switches 104 of electro-optic non-crystalline materials, such as electro-optic polymer or glass materials, placed between the demultiplexer 102 and the multiplexer 103, and is located between the optical amplifier 106 and the wavelength converter 105. This N channel high-speed wavelength channel selector B performs a wavelength channel selecting process for the amplified optical signal supplied from the optical amplifier 106 and outputs a wavelength channel selected optical signal to the wavelength converter 105.

The wavelength converter 105 is placed on an output signal waveguide of the N channel high-speed wavelength channel selector B and executes wavelength conversion of the wavelength channel selected optical signal outputted from the N channel high-speed wavelength channel selector B by passing it through nonlinear optical materials together with a pump laser beam. This wavelength converter 105 can be formed either with an externally attachable digital wavelength selective type wavelength converter or with a planar-type wavelength converter integrated on the same wafer with the space multiplexed channel selector A and the high-speed wavelength selector B.

Further, in order to reduce optical losses, the space and wavelength multiplexed channel selector 100-1 can be integrated with a rare earth ion doped planar-type optical amplifier, so that there is provided a low loss high-speed digital wavelength convertible M×1 space and N×1 wavelength channel selector.

The M array of planar waveguide-type electro-optic switches 104a and the M×1 channel combiner 107 of the M channel space multiplexed channel selector A can be formed in an integration of single-type polymer or glass materials or in a combined integration of the polymer and glass materials.

In the N channel high-speed wavelength selector B, the N array of planar waveguide-type optical switches 104 can be formed with Mach-Zehnder type electro-optic switches, and the wavelength demultiplexer 102 and multiplexer 103 and the planar waveguide-type optical switches 104 can be made in a monolithically integrated form by using single-type polymer or glass materials, or in a hybrid-type integrated form by using glass materials for the wavelength demultiplexer 102 and multiplexer 103 and electro-optic polymer materials for the planar waveguide-type optical switches 104.

The monolithic integration using the polymer or glass materials has advantages of easy manufacturing processing, low fabrication cost, and high practical applicability compared to the conventional ways of monolithic or hybrid integration using semiconductor materials.

Figure 12:
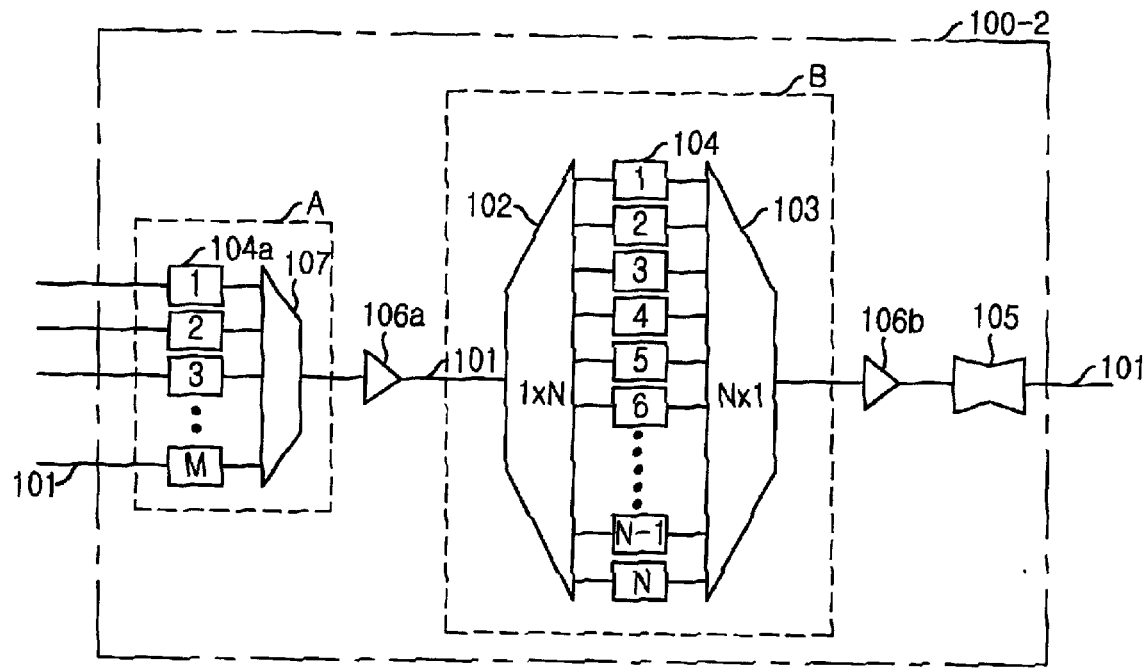
FIG. 12 is a block diagram of a high-speed photonic integrated circuit-type space and wavelength multiplexed channel selector in accordance with another embodiment of the present invention, which uses the high-speed wavelength channel selector illustrated in FIG. 10, an M×1 space channel selector, two optical amplifiers and a wavelength converter.

Referring to FIG. 12, there is provided a block diagram of a high-speed photonic integrated circuit-type space and wavelength multiplexed channel selector 100-2 in accordance with another embodiment of the present invention, which includes an M channel space multiplexed channel selector A, optical amplifiers 106a and 106b, an N channel high-speed wavelength channel selector B and a wavelength converter 105, all integrated on optical waveguides 101.

The M channel space multiplexed channel selector A has an M array of electro-optic optical waveguide switches 104a and one M×1 channel combiner 107, and is placed on an input end of the high-speed photonic integrated circuit-type space and wavelength multiplexed channel selector 100-2.

The first optical amplifier 106a is in the form of a planar optical waveguide and is integrated on the optical waveguide 101 connecting the M channel space multiplexed channel selector A to the N channel high-speed wavelength channel selector B to amplify a space channel selected WDM optical signal transmitted from the M channel space multiplexed channel selector A and to deliver an amplified optical signal to the high-speed N wavelength channel selector B.

As shown in FIG. 10, the N channel high-speed wavelength channel selector B is constructed by a pair of wavelength demultiplexer 102 and multiplexer 103 and an N array of planar waveguide-type electro-optic switches 104 of electro-optic polymer or glass materials placed between the demultiplexer 102 and the multiplexer 103, and is located between the first optical amplifier 106a and the second optical amplifier 106b. This N channel high-speed wavelength selector B performs a wavelength channel selecting process for the amplified optical signal provided from the first optical amplifier 106a and outputs a wavelength channel selected optical signal to the second optical amplifier 106b.

The second optical amplifier 106b is placed on the optical waveguide 101 connecting an output port of the N channel high-speed wavelength channel selector B to the wavelength converter 105 to amplify the wavelength channel selected optical signal.

The wavelength converter 105 is located on the output optical waveguide 101 which comes out from the output port of the N channel high-speed wavelength channel selector B and passes through the second optical amplifier 106b, and outputs a wavelength converted optical signal by passing the amplified wavelength channel selected optical signal supplied from the second optical amplifier 106b through nonlinear optical materials together with a pump laser beam.

Here, the M channel space multiplexed channel selector A can be formed with externally attachable general discrete devices or can be formed in a single wafer with planar optical waveguide-type devices, which can be used as a major integrated device for high-capacity optical signal processing of M×1 space and N×1 wavelength multiplexed signals.

Figure 13:
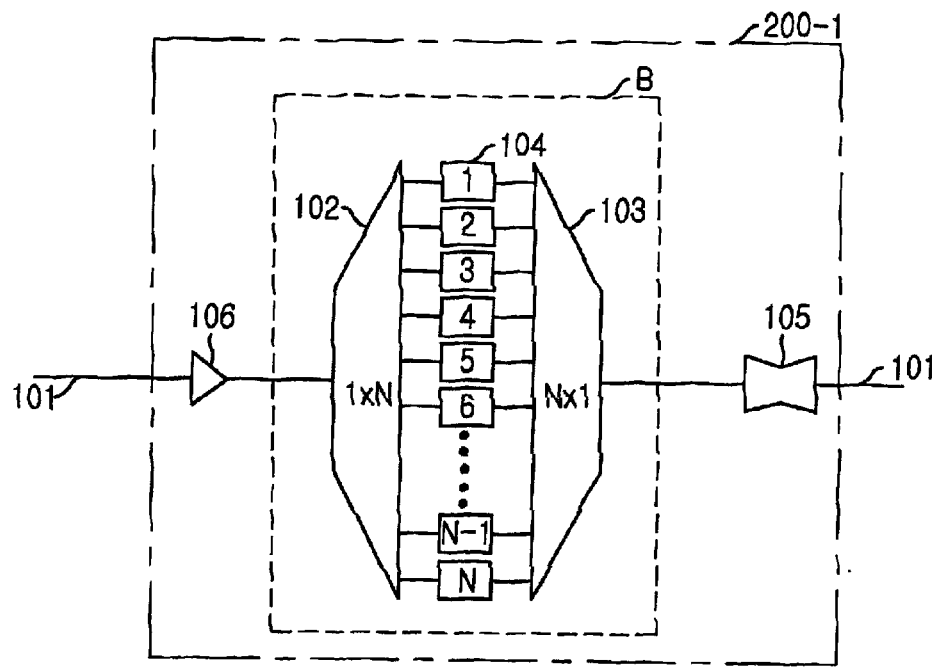
FIG. 13 is a block diagram of a high-speed photonic integrated circuit-type wavelength channel selector in accordance with one embodiment of the present invention, which uses the high-speed wavelength channel selector illustrated in FIG. 10, an optical amplifier placed at an input signal port and a wavelength converter placed at an output signal port.

Referring to FIG. 13, there is provided a block diagram of a high-speed photonic integrated circuit-type wavelength channel selector 200-1 in accordance with one embodiment of the present invention, which employs the high-speed wavelength channel selector B illustrated in FIG. 10, an optical amplifier 106 placed at an input signal port and a wavelength converter 105 placed at an output signal port, all integrated on a single optical waveguide 101.

The high-speed wavelength channel selector B includes a pair of wavelength demultiplexer 102 and multiplexer 103 and an N array of planar waveguide-type electro-optic switches 104 of electro-optic polymer or glass materials placed between the demultiplexer 102 and the multiplexer 103, all placed on the single optical waveguide 101.

The optical amplifier 106 is placed on the optical waveguide 101 for a signal input, i.e., on the optical waveguide located in front of the high-speed N wavelength channel selector B.

The wavelength converter 105 is placed on the optical waveguide 101 for a signal output, i.e., on the optical waveguide located in the back of the high-speed N wavelength channel selector B.

Therefore, the above scheme corresponds to a scheme without the M channel space multiplexed channel selector A illustrated in FIG. 11 and, thus, only processes wavelength-division multiplexed optical signals without including space-division multiplexed signals.

Figure 14:
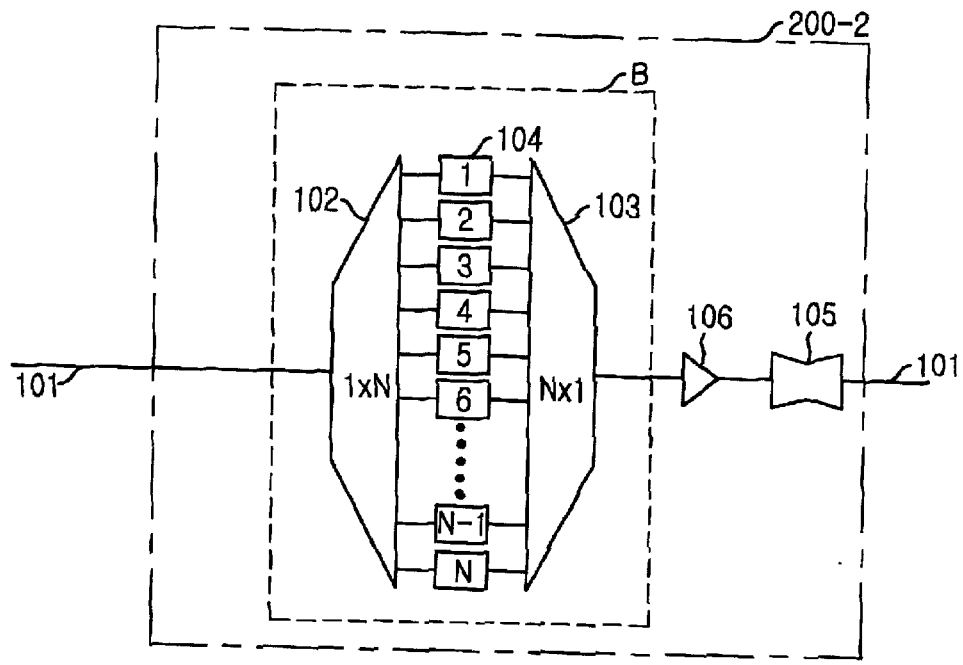
FIG. 14 is a block diagram of a high-speed photonic integrated circuit-type wavelength channel selector in accordance with another embodiment of the present invention, which uses the high-speed wavelength channel selector illustrated in FIG. 10, a wavelength converter placed at an output signal port and an optical amplifier placed in the middle between the channel selector and the wavelength converter.

FIG. 14 represents a block diagram of a high-speed photonic integrated circuit-type wavelength channel selector 200-2 in accordance with another embodiment of the present invention, which includes a high-speed wavelength channel selector B, an optical amplifier 106 and a wavelength converter 105.

As illustrated in FIG. 10, the N channel high-speed wavelength channel selector B has a pair of wavelength demultiplexer 102 and multiplexer 103 and an N array of planar waveguide-type electro-optic switches 104 of electro-optic polymer or glass materials placed between the demultiplexer 102 and the multiplexer 103, all distributed on a single optical waveguide 101.

Unlike that of FIG. 13, the optical amplifier 106 is located in the back of the high-speed N wavelength channel selector B.

The optical wavelength converter 105 is located on the optical waveguide 101 for a signal output, i.e., on the optical waveguide positioned in the back of the optical amplifier 106.

Unlike the scheme described in FIG. 13, this scheme corresponds to a scheme with no optical amplifier in front of the N channel high-speed wavelength channel selector B but with the optical amplifier 106 located between an output port of the N channel high-speed wavelength channel selector B and an input port of the optical wavelength converter 105 to achieve a loss free wavelength channel selector.

The optical amplifier 106 can be one of various kinds of optical amplifiers just like the optical amplifiers illustrated in FIGS. 11 and 12, and can be integrated in a plane wafer through the use of a planar-type optical amplifier.

Figure 15:
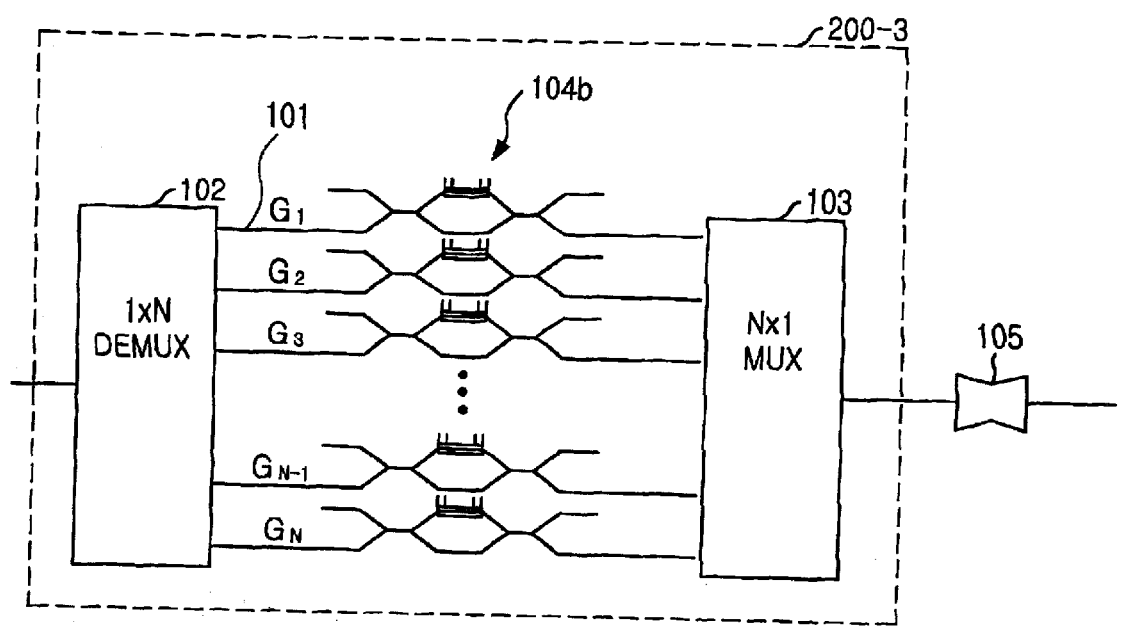
FIG. 15 is a block diagram of a high-speed photonic integrated circuit-type wavelength channel selector in accordance with still another embodiment of the present invention, which uses the high-speed wavelength channel selector illustrated in FIG. 10 and a wavelength converter placed at an output signal port.

Referring to FIG. 15, there is shown a block diagram of a high-speed photonic integrated circuit-type wavelength channel selector 200-3 in accordance with still another embodiment of the present invention, which includes a pair of wavelength demultiplexer 102 and multiplexer 103 and an N array of Mach-Zehnder type electro-optic planar waveguide switches 104b of electro-optic polymer or glass materials placed on an N array of optical waveguides 101 connecting the 1×N wavelength demultiplexer 102 and the N×1 wavelength multiplexer 103.

The N array of the Mach-Zehnder type electro-optic waveguide switches 104b can be formed on the optical waveguide paths connecting the N channel ports of the wavelength demultiplexer 102 and multiplexer 103. This scheme can be monolithically integrated by using single-type materials of either polymer or glass for all the components of the wavelength demultiplexer 102 and multiplexer 103 and the electro-optic waveguide switches 104b, or integrated in the form of a hybrid by using the glass materials for the wavelength demultiplexer 102 and multiplexer 103 and the electro-optic polymer materials for the electro-optic waveguide switches 104b.

The high-speed photonic integrated circuit-type wavelength channel selector 200-3 performs signal processing for merely wavelength-division multiplexed signals without including any space-division multiplexed signal described in the schemes shown in FIGS. 11 and 12.

Figure 16:
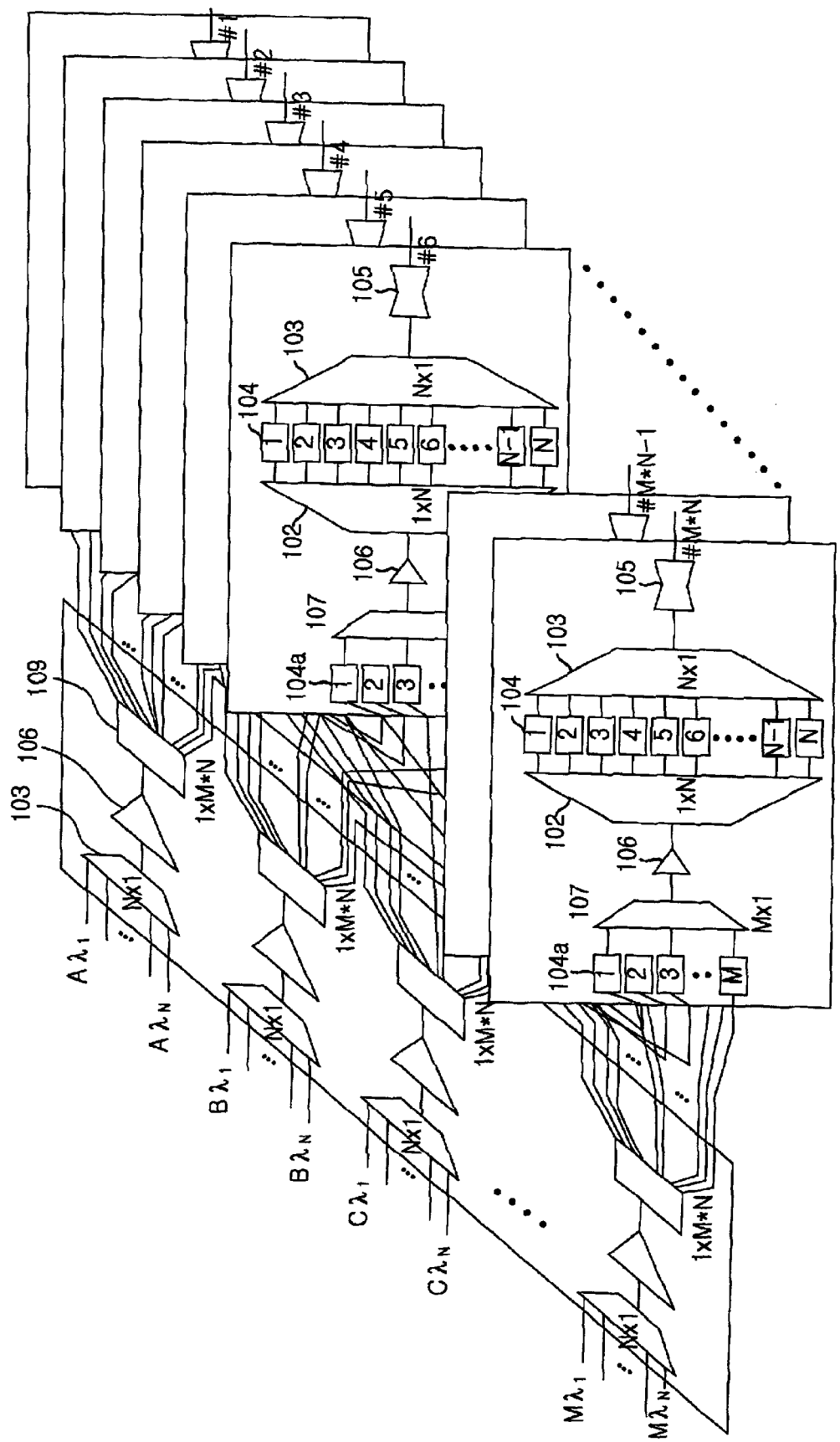
FIG. 16 is a block diagram showing an optical switching fabric for space and wavelength multiplexed signal processing in accordance with the present invention, which uses a high-speed photonic integrated circuit-type space and wavelength multiplexed channel selector.

Referring to FIG. 16, there is provided a block diagram showing an optical switching fabric for space and wavelength multiplexed signal processing in accordance with the present invention, which employs high-speed photonic integrated circuit-type space and wavelength multiplexed channel selectors.

The optical switching fabric is an example of application schemes of the high-speed photonic integrated circuit-type space and wavelength multiplexed channel selector illustrated in FIG. 11 for the processing of M space multiplexed and N wavelength multiplexed optical signals. Since M×N numbers of the high-speed photonic integrated circuit-type space and wavelength multiplexed channel selectors are required for the switching fabric scheme, a configuration of the entire system becomes simple and the system can achieve low cost by using the inventive high-speed photonic integrated circuit-type space and wavelength multiplexed channel selector which is formed with monolithic integration of an M space multiplexed channel selector, an N channel high-speed wavelength channel selector, one or more optical amplifiers and a wavelength converter.

Figure 17A:
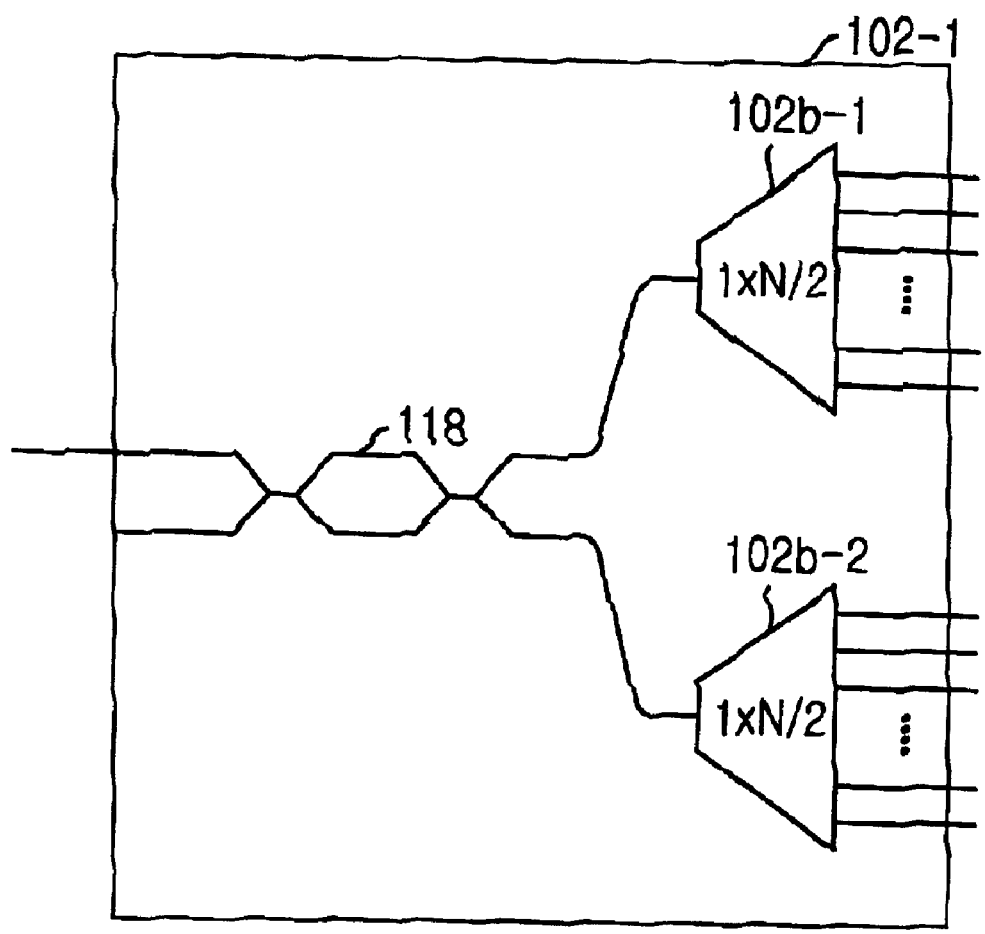
FIG. 17A is a block diagram of a 1×N wavelength demultiplexer in accordance with one embodiment of the present invention, which is used in FIGS. 10 to 15 and employs a wavelength interleaver and two 1×N/2 wavelength demultiplexers.
Figure 17B:
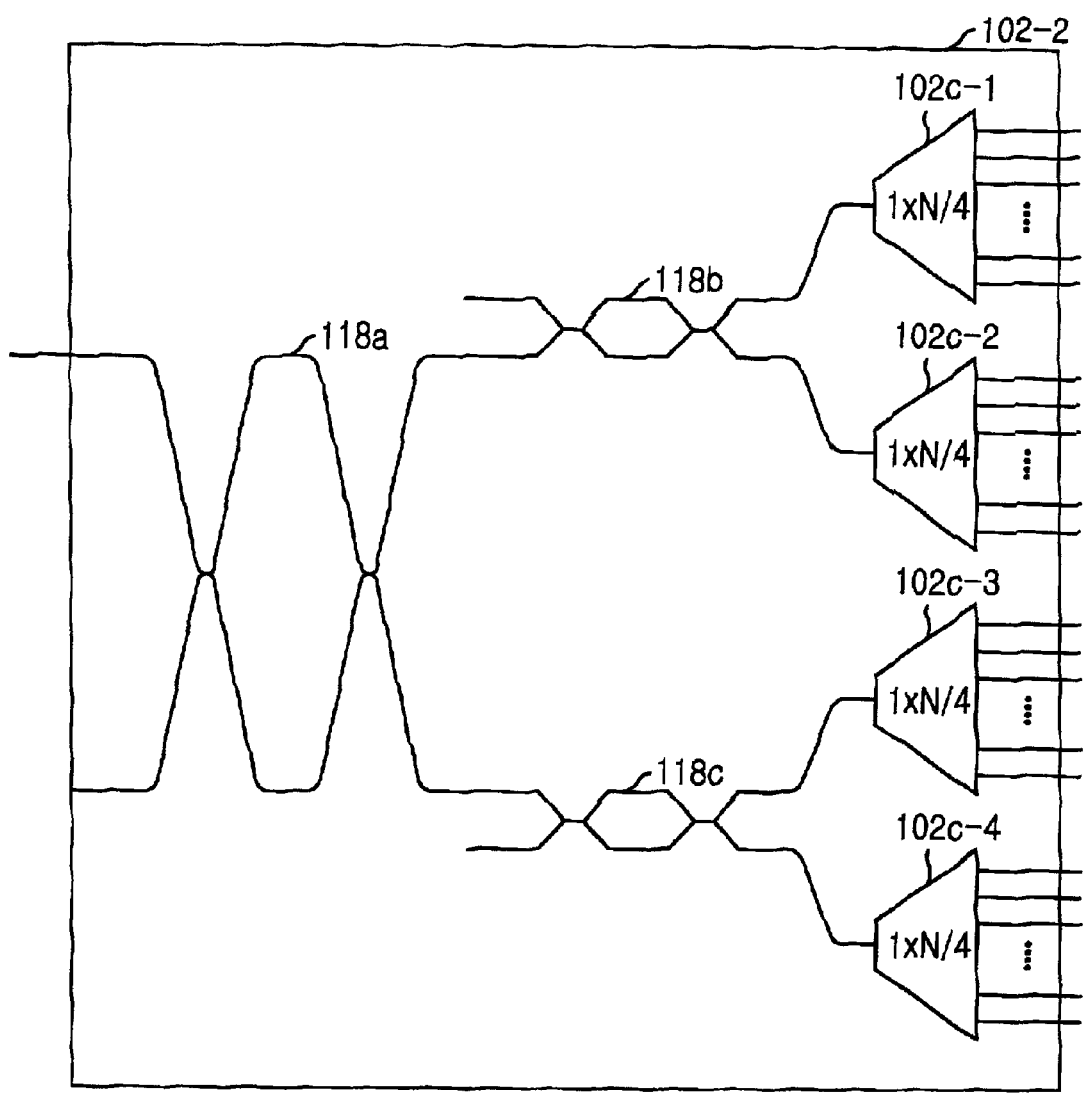
FIG. 17B is a block diagram of a 1×N wavelength demultiplexer in accordance with another embodiment of the present invention, which is used in FIGS. 10 to 15 and employs a cascaded structure of wavelength interleavers.

FIGS. 17A and 17B are block diagrams showing two exemplary schemes of the 1×N wavelength demultiplexer 102 in accordance with some embodiments of the present invention, which are used in FIGS. 10 to 15 and utilize wavelength interleaver(s). That is, FIGS. 17A and 17B show optical interleavers used to form the wavelength demultiplexer in the high-speed wavelength selector and the wavelength selectable laser of the present invention. As shown in FIGS. 17A and 17B, the demultiplexed channel number of the wavelength demultiplexer can be reduced according to the number of the optical interleavers used in the configurations.

FIG. 17A illustrates a 1×N wavelength demultiplexer 102-1 using one optical interleaver 118 and two 1×N/2 wavelength demultiplexers 102b-1 and 102b-2 and FIG. 17B shows a 1×N wavelength demultiplexer 102-2 using a two stage wavelength interleaved scheme with three optical interleavers 118a, 118b and 118c and four 1×N/4 wavelength demultiplexers 102c-1 to 102c-4.

Thus, the N channel wavelength multiplexing scheme capable of handling relatively many wavelength channels can be formed by using multi-stage optical interleavers. This optical interleavers can be made of optical fiber type interleavers or planar waveguide-type optical interleavers.

Figure 18:
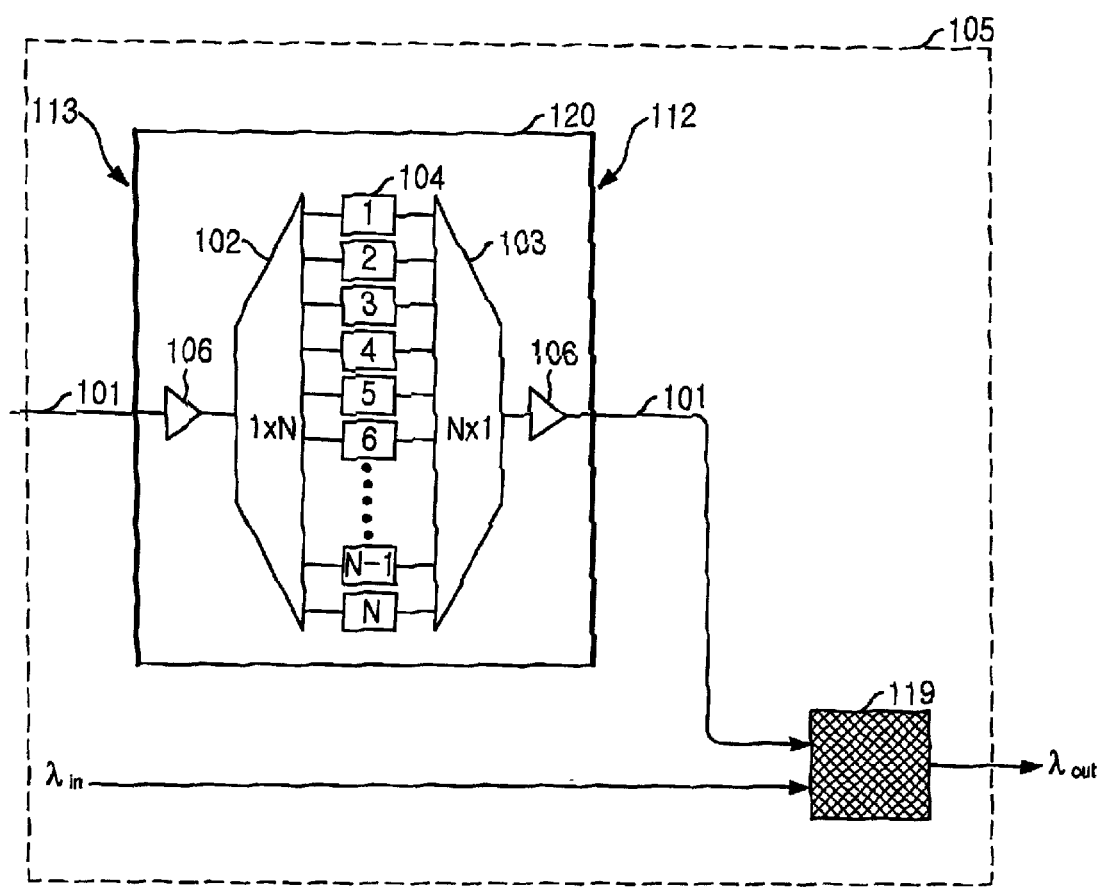
FIG. 18 is a detailed block diagram of a wavelength converter in accordance with the present invention, which is used in FIGS. 11 to 15 and employs a wavelength selectable laser.

Referring to FIG. 18, there is depicted a detailed block diagram of the wavelength converter 105 in accordance with the present invention, which is used in FIGS. 11 to 15 and includes an N channel wavelength selectable laser 120 and a nonlinear optical medium 119 for wavelength conversion.

The N channel wavelength selectable laser 120 is in the form of placing optical amplifiers 106a and 106b with certain optical gains at both ends of the high-speed N channel wavelength selector illustrated in FIGS. 11 to 14, a highly reflective mirror 113, coated on a cross section of an input terminal end of an optical waveguide 101, for highly reflecting optical beams and a partially reflective mirror 112, coated on a cross section of an output terminal end of the optical waveguide 101, for partially reflecting optical beams and outputting a pump laser beam to be resonated between the highly reflective mirror 113 and the partially reflective mirror 112.

In FIG. 18, the N channel wavelength selectable laser 120 is used as a pump laser beam source, and the high-speed channel selectable wavelength conversion from an input signal wavelength $\lambda_{in}$ into a converted output signal wavelength $\lambda_{out}$ can be achieved by passing the pump laser beam outputted from the N channel wavelength selectable laser 120 through the nonlinear optical medium 119 together with the input signal $\lambda_{in}$.

Since high-speed selection of a wavelength of the pump laser beam is possible in the above wavelength conversion scheme, a specified wavelength of the pump laser beam can be selected to provide the wavelength converted output signal suitable for the wavelength-division multiplexed optical communications. This wavelength conversion scheme can be formed either by packaging and integrating discrete optical function devices or by integrating all the optical function devices on a single wafer to implement a photonic integrated circuit.

Figure 19A:
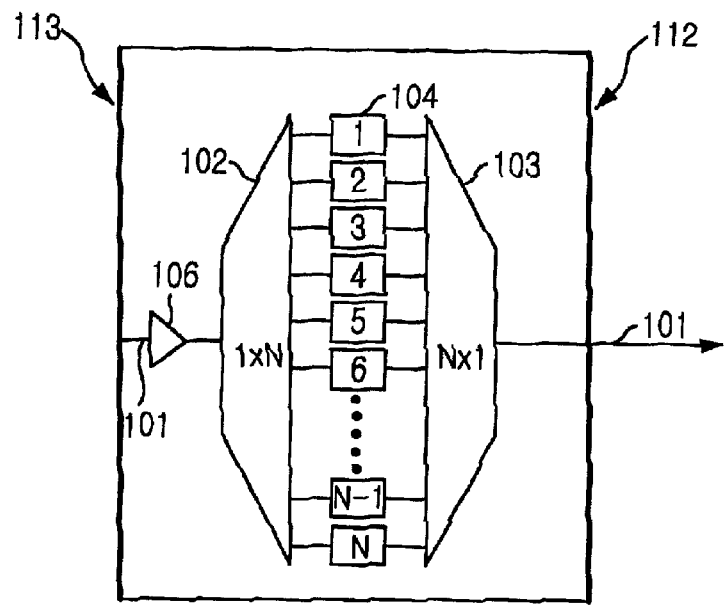
FIGS. 19A to 19C are block diagrams showing three different exemplary schemes of the photonic integrated circuit-type wavelength channel selectable laser in accordance with the present invention, which employ the high-speed wavelength channel selector illustrated in FIG. 10, an optical gain medium (or media), a highly reflective mirror and a partially reflective mirror.
Figure 19B:
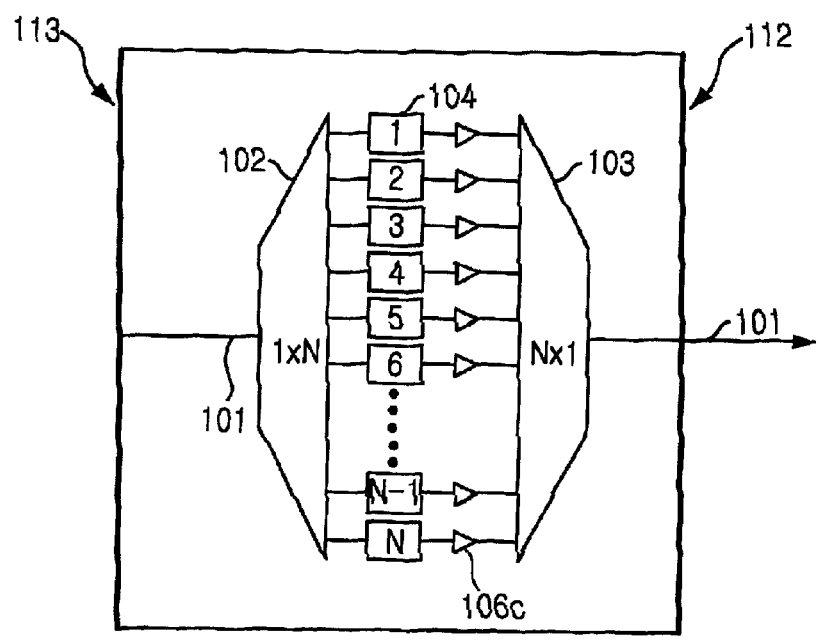
Figure 19C:
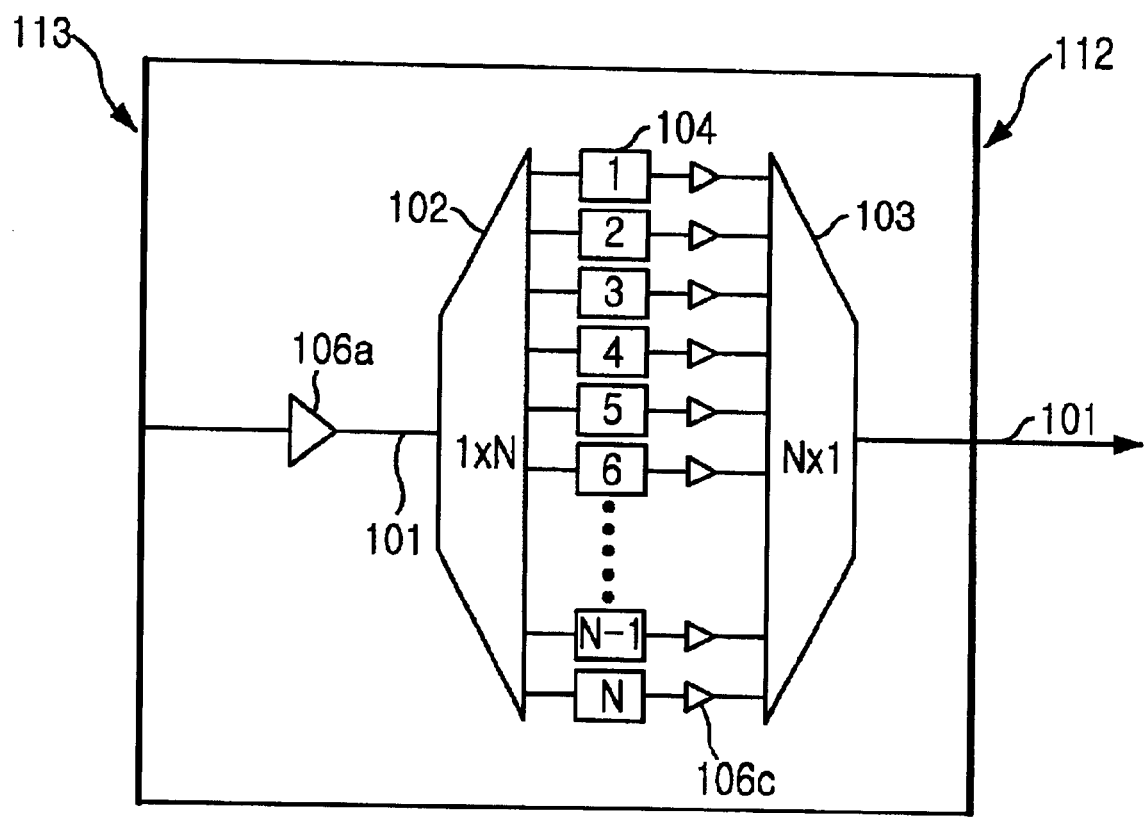

Referring to FIGS. 19A to 19C, there are provided block diagrams showing three different exemplary schemes of a photonic integrated circuit-type wavelength channel selectable laser in accordance with the present invention, which employ the high-speed wavelength channel selector illustrated in FIG. 10. These exemplary schemes show high-speed N channel wavelength selectable lasers each of which can be used as a pump laser beam source for a wavelength converter.

FIG. 19A represents a configuration including the high-speed N channel wavelength channel selector, 102, 103 and 104, of a low loss waveguide-type geometry, an optical amplifier 106 being an optical gain medium with a certain optical gain placed on an input side of a waveguide 101, a highly reflective mirror 113 coated on an input side end of the waveguide 101, and a partially reflective mirror 112 coated on an output side end of the waveguide 101.

FIG. 19B illustrates a configuration employing an N array of optical amplifiers 106c placed next to an N array of optical switches 104 between wavelength demultiplexer 102 and multiplexer 103 in a similar scheme of the high-speed wavelength channel selector described above, a highly reflective mirror 113 coated on an input side end of a waveguide 101, and a partially reflective mirror 112 coated on an output side end of the waveguide 101.

FIG. 19C depicts a configuration including an additional optical amplifier 106a placed on a single optical waveguide 101 connecting a highly reflective mirror 113 to a 1×N wavelength demultiplexer 102 in the configuration of FIG. 19B.

The optical amplifiers or optical gain media in the above schemes can be made of optically pumped optical amplifiers or electro-luminescent materials. These schemes can be formed with a combination of discrete external devices or with integration of multi-functional planar waveguide optical devices of polymer or glass materials.

The high-speed wavelength multiplexed channel selector in accordance with the present invention has advantages of simple fabrication and easy channel extension, and can be used for demonstration of high-speed space and wavelength multiplexed channel selectors in monolithic integration with various optical functional devices on a single wafer. The present invention will be applicable for optical switching, optical crossconnects, tunable optical add-drop multiplexers, and optical signal processing in future large capacity optical communication systems, and will contribute development of large capacity optical communication networks, optical Internet, optical computers and so on.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A high-speed wavelength channel selector comprising:
   a pair of wavelength multiplexer and demultiplexer formed on an optical waveguide; and
   a multi-channel optical waveguide switch array of electro-optic non-crystalline materials placed between the multiplexer and the demultiplexer, wherein the multiplexer, the demultiplexer and the optical waveguide switch array are constructed the form of a single integrated device,
   wherein the multiplexer, the demultiplexer and the optical waveguide switch array are made of non-crystalline materials, and
   wherein the optical waveguide switch array employs Mach-Zehnder type electro-optic switches.

2. The high-speed wavelength channel selector according to claim 1, wherein the multiplexer and the demultiplexer is made of glass materials and the optical waveguide switch array is made of polymer materials.

3. A high-speed photonic integrated circuit-type wavelength channel selector comprising:
   a wavelength channel selecting means for selecting a wavelength channel of an input optical signal, which includes a pair of wavelength demultiplexer and multiplexer formed on an optical waveguide and a multi-channel optical waveguide switch array of electro-optic non-crystalline materials placed on a waveguide array connecting the wavelength demultiplexer and the wavelength multiplexer; and
   a wavelength converting means, located on an output end of the wavelength channel selecting means, for converting a wavelength of a wavelength channel selected optical signal and outputting a wavelength converted optical signal by passing the wavelength channel selected optical signal through a nonlinear optic medium together with a pump laser beam.

4. The high-speed photonic integrated circuit-type wavelength channel selector as recited in claim 3 further comprising:
   an optical amplifying means, located on a waveguide in front of the wavelength channel selecting means, for amplifying the input optical signal.

5. The high-speed photonic integrated circuit-type wavelength channel selector as recited in claim 3 further comprising:
   an optical amplifying means, located on a waveguide connecting the wavelength channel selecting means to the wavelength converting means, for amplifying the wavelength channel selected optical signal.

6. The high-speed photonic integrated circuit-type wavelength channel selector as recited in claim 3 further comprising:
   a first optical amplifying means, located on a waveguide in front of the wavelength channel selecting means, for amplifying the input optical signal; and
   a second optical amplifying means, located on a waveguide connecting the wavelength channel selecting means and the wavelength converting means, for amplifying the wavelength channel selected optical signal.

7. A high-speed photonic integrated circuit-type space and wavelength multiplexed channel selector comprising:
   a space multiplexed channel selecting means for outputting a space channel selected wavelength-division multiplexed (WDM) optical signal based on an inputted space and wavelength-division multiplexed optical signal, which includes M numbers of optical waveguide switches and an MX1 optical channel combiner, M being an integer equal to or greater than 2;
   a wavelength channel selecting means for selecting a wavelength channel of the space channel selected WDM optical signal, which is connected to an output end of the space multiplexed channel selecting means and includes a pair of 1×N wavelength demultiplexer and N×1 wavelength multiplexer, N being an integer equal to or greater than 2, and a multi-channel optical waveguide switch array of electro-optic non-crystalline materials placed on a waveguide array connecting the demultiplexer and the multiplexer; and
   a wavelength converting means, located on an output end of the wavelength channel selecting means, for converting a wavelength of a wavelength channel selected optical signal and outputting a wavelength converted optical signal by passing the wavelength channel, selected optical signal through a nonlinear optic medium together with a pump laser beam, wherein the optical waveguide switches of the space multiplexed channel selecting means are made of non-crystalline materials.

8. The high-speed photonic integrated circuit-type space and wavelength multiplexed channel selector of claim 7 further comprising:

an optical amplifying means, located on a waveguide connecting the space multiplexed channel selecting means and the wavelength channel selecting means, for amplifying the space channel selected WDM optical signal.

9. The high-speed photonic integrated circuit-type space and wavelength multiplexed channel selector of claim 7 further comprising:

an optical amplifying means, located on a waveguide connecting the wavelength channel selecting means and the wavelength converting means, for amplifying the wavelength channel selected optical signal.

10. The photonic integrated circuit-type space and wavelength multiplexed channel selector of claim 7 further comprising:

a first optical amplifying means, located on a waveguide connecting the space multiplexed channel selecting means and the wavelength channel selecting means, for amplifying the space channel selected WDM optical signal; and a second optical amplifying means, located on a waveguide connecting the wavelength channel selecting means and the wavelength converting means, for amplifying the wavelength channel selected optical signal.

11. The high-speed photonic integrated circuit-type space and wavelength multiplexed channel selector of claim 7, wherein the wavelength channel selecting means includes the pair of demultiplexer and multiplexer made of polymer materials and the multi-channel optical waveguide switch array made of electro-optic polymer materials, all of the multiplexer, the demultiplexer and the optical waveguide switch array being formed in monolithic integration.

12. The high-speed photonic integrated circuit-type space and wavelength multiplexed channel selector of claim 7, wherein the wavelength channel selecting means includes the pair of demultiplexer and multiplexer made of glass materials and the multi-channel optical waveguide switch array made of electro-optic glass materials, all of the demultiplexer, the multiplexer and the optical waveguide switch array being formed in monolithic integration.

13. The high-speed photonic integrated circuit-type space and wavelength multiplexed channel selector of claim 7, wherein the wavelength channel selecting means includes the pair of demultiplexer and multiplexer made of glass materials and the multi-channel optical waveguide switch array made of electro-optic polymer materials, all of the demultiplexer, the multiplexer and the optical waveguide switch array being formed in hybrid integration.

14. The high-speed photon-14c integrated circuit-type space and wavelength multiplexed channel selector of claim 7, wherein the wavelength demultiplexer has:

a 1×2 optical interleaver for interleaving the space channel selected WDM optical signal into twice WDM channel separation compared to the original one; and two 1×N/2 demultiplexers for demultiplexing wavelengths of interleaved optical signals.

15. The high-speed photonic integrated circuit-type space and wavelength multiplexed channel selector of claim 7, wherein the wavelength demultiplexer has:

a first 1×2 optical interleaver for firstly interleaving the space channel selected WDN optical signal;

two second interleavers connected to each output port of the first 1×2 optical interleaver, respectively, for secondly interleaving a firstly interleaved optical signal; and four 1×N/4 wavelength multiplexers for demultiplexing wavelengths of secondly interleaved optical signals.

16. The high-speed photonic integrated circuit-type space and wavelength multiplexed channel selector of claim 7, wherein the wavelength converting means includes:

an N channel wavelength selectable laser for outputting the pump laser beam; and the nonlinear optical medium for converting the wavelength of the wavelength channel selected optical signal through nonlinear optical interaction with the pump laser beam.

17. The high-speed photonic integrated circuit-type space and wavelength multiplexed channel selector of claim 16, wherein the N channel wavelength selectable laser has:

a wavelength channel selecting means for selecting a wavelength of a resonating laser beam, which contains a pair of 1×N wavelength demultiplexer and N×1 wavelength multiplexer and a multi-channel optical waveguide switch array of electro-optic non-crystalline materials placed on a waveguide array connecting said demultiplexer and said multiplexer;

a first optical amplifying means, placed at an input side of said wavelength channel selecting means, for providing an optical gain spectrum to said wavelength channel selecting means and amplifying said resonating laser beam between a first reflective mirror and a second reflective mirror;

a second optical amplifying means, placed at an output side of said wavelength channel selecting means, for providing a certain optical gain to said resonating laser beam;

the first reflective mirror, coated on a cross section of one waveguide end of the first optical amplifying means with respect to the other end connected to said wavelength channel selecting means, for highly reflecting optical beams; and the second reflective mirror, coated on a cross section of one waveguide end of the second optical amplifying means with respect to the other end connected to said wavelength channel selecting means, for partially reflecting optical beams and outputting said resonating laser beam.

18. The high-speed photonic integrated circuit-type space and wavelength multiplexed channel selector of claim 16, wherein the N channel wavelength selectable laser has:

a wavelength channel selecting means for selecting a wavelength of a resonating laser beam, which contains a pair of 1×N wavelength demultiplexer and N×1 wavelength multiplexer and a multi-channel optical waveguide switch array of electro-optic non-crystalline materials placed on a waveguide array connecting said demultiplexer and said multiplexer;

an optical amplifying means, placed at an input side of said wavelength channel selecting means, for providing an optical gain spectrum to said wavelength channel selecting means and amplifying said resonating laser beam between a first reflective mirror and a second reflective mirror;

the first reflective mirror, coated on a cross section of one waveguide end of the optical amplifying means with respect to the other end connected to said wavelength channel selecting means, for highly reflecting optical beams; and the second reflective mirror, coated on a cross section of an optical waveguide at an output end of said wavelength channel selecting means, for partially reflecting optical beams and outputting said resonating laser beam.

19. The high-speed photonic integrated circuit-type space and wavelength multiplexed channel selector of claim 16, wherein the N channel wavelength selectable laser has:

a wavelength channel selecting means for selecting a wavelength of a resonating laser beam, which contains a pair of 1×N wavelength demultiplexer and N×1 wavelength multiplexer, a multi-channel optical waveguide switch array of electro-optic non-crystalline materials placed between said demultiplexer and said multiplexer and an optical amplifier array connected in parallel between the multi-channel optical waveguide switch array and said multiplexer;

a first reflective mirror, coated on a cross section of one waveguide end of said wavelength channel selecting means, for highly reflecting optical beams; and a second reflective mirror, coated on a cross section of the other waveguide end of said wavelength channel selecting means, for partially reflecting optical beams and outputting said resonating laser beam.

20. The high-speed photonic integrated circuit-type space and wavelength multiplexed channel selector of claim 16, wherein the N channel wavelength selectable laser has:

a wavelength channel selecting means for selecting a wavelength of a resonating laser beam, which contains a pair of 1×N wavelength demultiplexer and N×1 wavelength multiplexer, a multi-channel optical waveguide switch array of electro-optic non-crystalline materials placed between said demultiplexer and said multiplexer and an optical amplifier array connected in parallel between the multi-channel optical waveguide switch array and said multiplexer;

an optical amplifying means, placed at an input side of said wavelength channel selecting means, for providing an optical gain spectrum to said wavelength channel selecting means and amplifying said resonating laser beam between a first reflective mirror and a second reflective mirror;

the first reflective mirror, coated on a cross section of one waveguide end of the optical amplifying means with respect to the other end connected to one waveguide end of said wavelength channel selecting means, for highly reflecting optical beams; and the second reflective mirror, coated on a cross section of the other waveguide end of said wavelength channel selecting means, for partially reflecting optical beams and outputting said resonating laser beam.

21. A high-speed wavelength channel selector according to claim 1, wherein the non-crystalline materials are at least one of a polymer and glass.

22. A high-speed photonic integrated circuit-type space and wavelength multiplexed channel selector according to claim 7, wherein the non-crystalline materials are at least one of a polymer and glass.

* * * * *